US012606398B2

(12) United States Patent
Shimada et al.

(10) Patent No.: US 12,606,398 B2
(45) Date of Patent: Apr. 21, 2026

(54) RELAY TRANSPORT DEVICE, RECORDING SYSTEM, AND FEEDING SYSTEM

(71) Applicant: SEIKO EPSON CORPORATION, Tokyo (JP)

(72) Inventors: Chiaki Shimada, Shiojiri (JP); Katsuyuki Kondo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 121 days.

(21) Appl. No.: 18/453,030

(22) Filed: Aug. 21, 2023

(65) Prior Publication Data

US 2024/0059513 A1 Feb. 22, 2024

(30) Foreign Application Priority Data

Aug. 22, 2022 (JP) ................................ 2022-131826
Aug. 22, 2022 (JP) ................................ 2022-131873
Oct. 31, 2022 (JP) ................................ 2022-174617
Oct. 31, 2022 (JP) ................................ 2022-174661

(51) Int. Cl.
*B65H 5/06* (2006.01)
*G03G 15/00* (2006.01)

(52) U.S. Cl.
CPC ......... *B65H 5/062* (2013.01); *G03G 15/6567* (2013.01); *B65H 2404/1424* (2013.01); *B65H 2511/20* (2013.01); *B65H 2801/06* (2013.01)

(58) Field of Classification Search
CPC .......... B65H 9/16; B65H 9/103; B65H 9/105; B65H 5/062; B65H 5/224; B65H 9/106
See application file for complete search history.

(56) References Cited

U.S. PATENT DOCUMENTS 4,440,389 A * 4/1984 Ames ..................... B65H 9/163 271/251
5,540,370 A * 7/1996 Ring ...................... B65H 29/60 271/253
5,582,087 A * 12/1996 Crowley ........... G03G 15/6564 101/232

(Continued)

FOREIGN PATENT DOCUMENTS

EP 1840061 A1 * 10/2007 ............... B65H 5/36
JP H11-334943 A 12/1999

(Continued)

*Primary Examiner* — Patrick Cicchino
(74) *Attorney, Agent, or Firm* — WORKMAN NYDEGGER

(57) ABSTRACT

A relay transport device is configured to relay a medium fed from the feeding device and transport the medium to the recording device. The relay transport device includes a first restriction section having a first restriction surface configured to position a first edge, which is one edge in a width direction, a first transport belt configured to transport the medium toward the first restriction surface in a first direction, which intersects the transport direction and the width direction, a second transport belt that is provided downstream of the first transport belt in the transport direction and that is configured to transport the medium toward the first restriction surface in a second direction, which intersects the transport direction and the width direction, and a suction section configured to suck the medium via a through hole provided in the first transport belt and the second transport belt.

15 Claims, 18 Drawing Sheets

(56) References Cited

U.S. PATENT DOCUMENTS

| | | | | |
|---|---|---|---|---|
| 6,206,591 | B1 * | 3/2001 | Kato | B65H 5/224 400/629 |
| 6,942,214 | B2 * | 9/2005 | Riccardi | B65H 5/021 271/227 |
| 8,070,456 | B2 * | 12/2011 | Mertens | F04D 27/001 417/44.1 |
| 10,894,681 | B2 * | 1/2021 | Gesner | B65H 9/12 |
| 11,180,334 | B2 * | 11/2021 | Matsumoto | B65H 5/062 |
| 2002/0079636 | A1 | 6/2002 | Riccardi | |
| 2010/0296854 | A1 | 11/2010 | Otsuki et al. | |

FOREIGN PATENT DOCUMENTS

| | | | | | |
|---|---|---|---|---|---|
| JP | 2010-269882 | A | | 12/2010 | |
| JP | 2011-121730 | A | | 6/2011 | |
| JP | 2014148409 | A | * | 8/2014 | |
| JP | 2017-190214 | A | | 10/2017 | |
| JP | 2022039784 | A | * | 3/2022 | B41J 11/007 |
| WO | WO-2020002638 | A1 | * | 1/2020 | B31B 70/04 |
| WO | WO-2023009130 | A1 | * | 2/2023 | B41J 70/04 |

* cited by examiner

RELAY TRANSPORT DEVICE, RECORDING SYSTEM, AND FEEDING SYSTEM

The present application is based on, and claims priority from JP Application Serial Number 2022-131826, filed Aug. 22, 2022, 2022-131873, filed Aug. 22, 2022, 2022-174617, filed Oct. 31, 2022, and 2022-174661, filed Oct. 31, 2022, the disclosure of which are hereby incorporated by reference herein in its entirety.

BACKGROUND

1. Technical Field

The present disclosure relates to a relay transport device that is disposed between a recording device and a feeding device and transports a medium. The present disclosure also relates to a recording system including the relay transport device.

2. Related Art

In a recording device represented by a printer, a leading edge of a paper sheet, which is an example of a medium, contacts against a roller pair to correct skew of the paper sheet. In JP-A-2017-190214, there is shown a recording device in which a leading edge of a paper sheet contacts against an alignment roller pair to correct skew of the paper sheet.

Sometimes a recording system is configured with an independent external feeding device installed with respect to a recording device and medium is supplied from the external feeding device to the recording device. In such a recording system, if the degree of skew is large when the medium is fed from the external feeding device, the skew may not be sufficiently corrected by the skew correction on the recording device side, and thus appropriate recording may not be executed.

SUMMARY

In order to solve the above problem, the relay transport device of the present disclosure is a relay transport device that is positioned between a recording device, which performs recording on a medium, and a feeding device, which is disposed outside the recording device and which feeds the medium to the recording device, and that is configured to relay the medium fed from the feeding device and transport the medium to the recording device, the relay transport device includes a first restriction section having a first restriction surface configured to position a first edge of the medium fed from the feeding device, the first edge being an edge in a width direction intersecting a transport direction; a first transport belt configured to transport the medium toward the first restriction surface in a first direction, which intersects the transport direction and the width direction; a second transport belt that is provided downstream of the first transport belt in the transport direction and that is configured to transport the medium toward the first restriction surface in a second direction, which intersects the transport direction and the width direction; and a suction section configured to suck the medium via a through hole provided in the first transport belt and the second transport belt.

A recording system of the present disclosure includes a recording device for recording on a medium; a feeding device disposed outside the recording device and configured to feed the medium to the recording device; the relay transport device being positioned between the recording device and the feeding device and configured to relay and transport the medium fed from the feeding device to the recording device.

DESCRIPTION OF EMBODIMENTS

Figure 1:
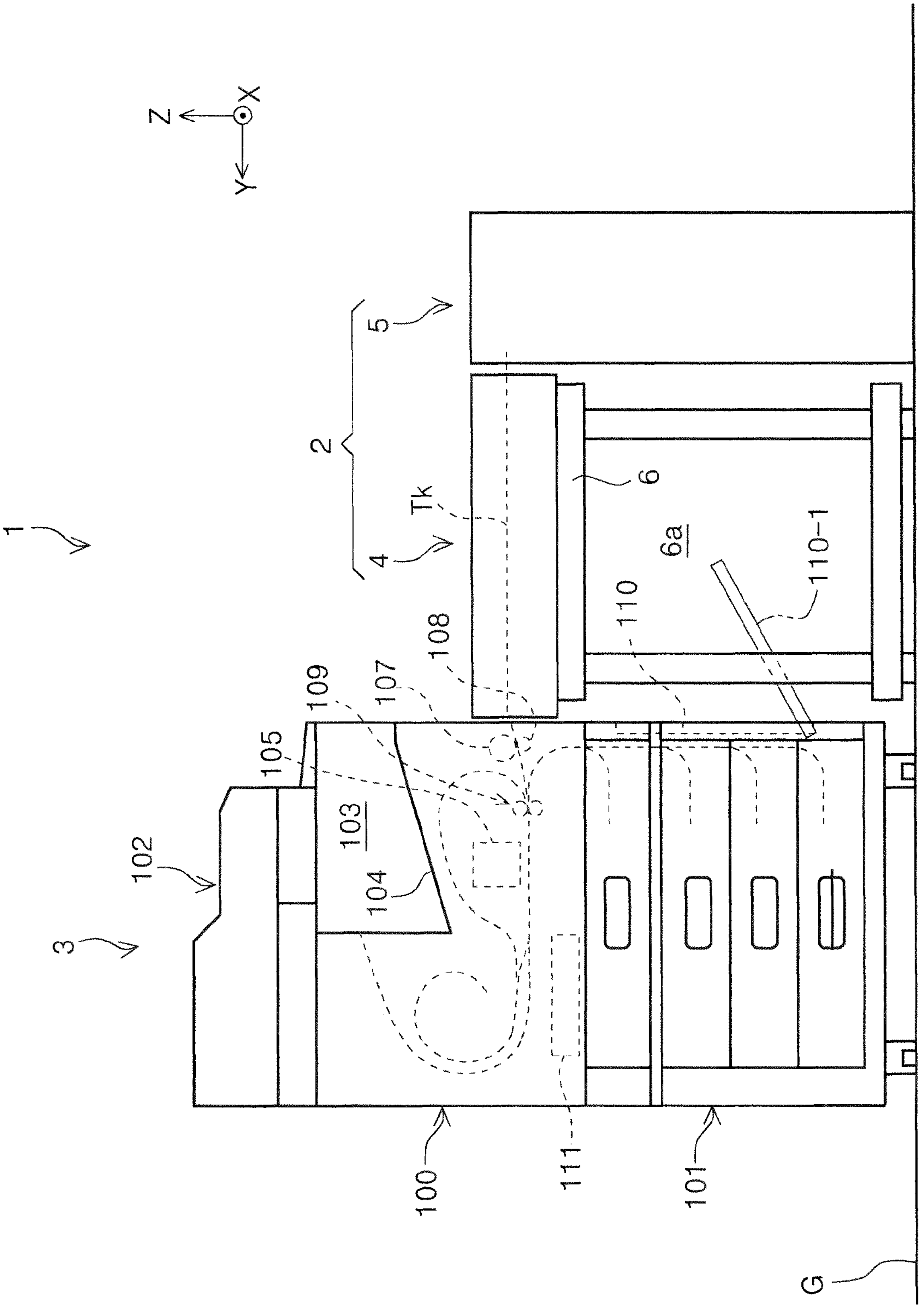
FIG. 1 is a front view of a recording system.

The present disclosure will be described in general terms.

A relay transport device according to a first aspect is a relay transport device that is positioned between a recording device, which performs recording on a medium, and a feeding device, which is disposed outside the recording device and which feeds the medium to the recording device, and that is configured to relay the medium fed from the feeding device and transport the medium to the recording device, the relay transport device includes a first restriction section having a first restriction surface configured to position a first edge of the medium fed from the feeding device, the first edge being an edge in a width direction intersecting a transport direction; a first transport belt configured to transport the medium toward the first restriction surface in a first direction, which intersects the transport direction and the width direction; a second transport belt that is provided downstream of the first transport belt in the transport direction and that is configured to transport the medium toward the first restriction surface in a second direction, which intersects the transport direction and the width direction; and a suction section configured to suck the medium via a through hole provided in the first transport belt and the second transport belt.

According to the present aspect, even when the medium fed from the feeding device is skewed, the skew is corrected by the first edge of the medium contacting the first restriction surface in the relay transport device. Further, the position of the medium in the width direction is less likely to vary compared with a configuration in which the skew is corrected by bringing the leading edge of the medium into contact with the roller pair. Thus, appropriate recording can be performed in the recording device.

In addition, according to the present aspect, since the first transport belt and second transport belt are configured to suck and transport the medium and bring the first edge of the medium into contact with the first restriction surface, the medium is easily rotated compared to a configuration in which the medium is nipped and transported by the roller pair, and thus it is possible to appropriately transport the skew of the medium.

In addition, according to the present aspect, since the skew of the medium is corrected by at least two transport belts of the first transport belt and the second transport belt, the transport distance to correct the skew of the medium can be secured, and the skew of the medium can be appropriately corrected.

If the transport distance for correcting the skew of the medium were to be secured by one transport belt, then the distance in the widthwise direction between the first restriction surface and the transport belt would be long upstream in the transport direction, and the force for pressing the first edge against the first restriction surface would be weak. If an inclination angle of the transport belt with respect to the transport direction were made small in order to suppress such a problem, the effect of correcting the skew would be reduced, so that the transport distance would need to be lengthened, resulting in an increase in the size of the device. However, according to present aspect, by correcting the skew of the medium using at least two transport belts, i.e., the first transport belt and the second transport belt, the first edge can be appropriately pressed against the first restriction surface, thereby suppressing an increase in the size of the device.

A second aspect is an aspect according to the first aspect, wherein the second direction is a direction along the first direction.

According to the present aspect, since the second direction is the direction along the first direction, it is possible to stably transport the medium.

A third aspect is an aspect according to the first aspect, wherein the first direction and the second direction are changeable.

According to the present aspect, since the first direction and the second direction are changeable, it is possible to perform appropriate skew correction.

This aspect is not limited to the first aspect, and may be applied to the second aspect.

A fourth aspect is an aspect according to the first aspect, wherein an angle formed by the transport direction and the second direction is smaller than an angle formed by the transport direction and the first direction.

According to the present aspect, since the angle formed by the transport direction and the second direction is smaller than the angle formed by the transport direction and the first direction, in the region of the first transport belt where the need for skew correction is high, the effect of skew correction is higher than that in the region of the second transport belt, and skew correction can be performed appropriately. In addition, in the region of the second transport belt where the medium is to be reliably supplied to the recording device, the medium is transported at an angle closer to the transport direction than in the region of the first transport belt, and it is possible to appropriately supply the medium to the recording device.

This aspect is not limited to the first aspect, and may be applied to the third aspect.

A fifth aspect is an aspect according to the first aspect, further includes a transport roller pair provided upstream in the transport direction with respect to the first transport belt and configured to transport the medium to the first transport belt, wherein an angle formed by the transport direction and the first direction is smaller than an angle formed by the transport direction and the second direction.

In a case where the transport roller pair is provided upstream of the first transport belt in the transport direction, it is difficult for the medium to rotate while the medium is nipped by the transport roller pair, and there is a concern that damage such as wrinkling will occur in the medium due to the restraining action of the transport roller pair and the rotating action of the first transport belt being simultaneously applied to the medium.

According to the present aspect, since the angle formed by the transport direction and the first direction is smaller than the angle formed by the transport direction and the second direction, the rotating action applied to the medium by the first transport belt is suppressed, and the occurrence of damage can be suppressed.

This aspect is not limited to the first aspect, and may be applied to the third aspect.

A sixth aspect is an aspect according to the first aspect, wherein a suction force of the first transport belt against the medium, a suction force of the second transport belt against the medium, or the suction force of the first transport belt against the medium and the suction force of the second transport belt against the medium are changeable according to the length of the medium in the width direction.

In a case where the medium overlaps with both the first transport belt and the second transport belt, a first moment around the center of gravity is generated in the medium by the transport force received from the first transport belt, and a second moment around the center of gravity is generated in the medium by the transport force received from the second transport belt. Here, if the first moment and the second moment are in the same direction and the rotation direction of the medium is the same as the skew correction direction, the skew of the medium is appropriately corrected. However, when the direction of the first moment and the direction of the second moment are opposite to each other, the rotation direction of the medium is opposite to the skew correction direction, so that the skew of the medium may not be appropriately corrected.

Since the centroid position of the medium changes according to the length of the medium in the width direction, and thus the direction of the first moment and the direction of the second moment are determined, the length of the medium in the width direction is important from the viewpoint of appropriately correcting the skew of the medium.

In the aspect, based on such a property, since the suction force of the first transport belt against the medium, the suction force of the second transport belt against the medium, or the suction force of the first transport belt against the medium and the suction force of the second transport belt against the medium are changeable according to the length of the medium in the width direction, it is possible to adjust the direction of the first moment and the direction of the second moment such that the skew of the medium is appropriately corrected, and thus it is possible to appropriately correct the skew of the medium.

This aspect is not limited to the first aspect, and may be applied to any of the second to fifth aspects.

A seventh aspect is an aspect according to the sixth aspect, wherein when a medium having a length in the width direction of the medium shorter than a predetermined length is transported, a suction force in a downstream region of the first transport belt in the transport direction against the medium is larger than a suction force in an upstream region of the second transport belt in the transport direction against the medium.

According to the present aspect, when the medium having the length in the width direction of the medium shorter than the predetermined length is transported, the suction force in the downstream region of the first transport belt in the transport direction against the medium is larger than the suction force in the upstream region of the second transport belt in the transport direction against the medium, it is possible to appropriately correct skewing when the medium having the length in the width direction shorter than the predetermined length is transported. Details thereof will be described later with reference to the drawings.

An eighth aspect is an aspect according to the sixth aspect, wherein when a medium having a length in the width direction of the medium shorter than a predetermined length is transported, the suction force of the first transport belt against the medium is larger than the suction force of the second transport belt against the medium.

According to the present aspect, when the medium having the length in the width direction of the medium shorter than the predetermined length is transported, the suction force of the first transport belt against the medium is larger than the suction force of the second transport belt against the medium, it is possible to appropriately correct skewing when the medium having the length in the width direction shorter than the predetermined length is transported. Details thereof will be described later with reference to the drawings.

In addition, in this aspect, since it is not necessary to partially change the suction force in the first transport belt and it is not necessary to partially change the suction force in the second transport belt, it is possible to suppress an increase in size and cost of the device by suppressing complication of the configuration.

A ninth aspect is an aspect according to the first aspect, further includes a transport roller pair provided upstream in the transport direction with respect to the first transport belt and configured to transport the medium to the first transport belt, wherein a suction force of the first transport belt against the medium or a suction force of the first transport belt against the medium and the suction force of the second transport belt against the medium are changeable.

In a case where the transport roller pair is provided upstream of the first transport belt in the transport direction, it is difficult for the medium to rotate while the medium is nipped by the transport roller pair, and there is a concern that damage such as wrinkling will occur in the medium due to the restraining action of the transport roller pair and the rotating action of the first transport belt being simultaneously applied to the medium. Further, depending on the length of the medium in the transport direction, the rotating action of the second transport belt may be applied at the same time, thereby causing the damage.

According to the present aspect, since the suction force of the first transport belt against the medium or the suction force of the first transport belt against the medium and the suction force of the second transport belt against the medium are changeable, the damage can be suppressed by changing the suction force of the first transport belt against the medium or the suction force of the first transport belt against the medium and the suction force of the second transport belt against the medium when there is a risk of the damage occurring.

This aspect is not limited to the first aspect, and may be applied to any of the second to fifth aspects.

A tenth aspect is an aspect according to the first aspect, further includes a transport roller pair provided upstream in the transport direction with respect to the first transport belt and configured to transport the medium to the first transport belt, wherein a suction force of the first transport belt against the medium is weaker than a suction force of a second transport belt against the medium.

In a case where the transport roller pair is provided upstream of the first transport belt in the transport direction, it is difficult for the medium to rotate while the medium is nipped by the transport roller pair, and there is a concern that damage such as wrinkling will occur in the medium due to the restraining action of the transport roller pair and the rotating action of the first transport belt being simultaneously applied to the medium.

According to the present aspect, since the suction force of the first transport belt against the medium is weaker than the suction force of the second transport belt against the medium, in the region of the first transport belt where the need for skew correction is high, the medium is more easily rotated in the region of the first transport belt, and skew correction can be performed appropriately. In addition, in the region of the second transport belt where the medium is to be reliably supplied to the recording device, the medium is less likely to rotate than in the region of the first transport belt, and it is possible to appropriately supply the medium to the recording device.

This aspect is not limited to the first aspect, and may be applied to any of the second to fifth aspects or the ninth aspect.

An eleventh aspect is an aspect according to the first aspect, wherein the suction section is provided separately for each of the first transport belt and the second transport belt.

According to the present aspect, since the suction section is provided for the first transport belt and the second transport belt, independent suction control can be performed for the first transport belt and the second transport belt.

This aspect is not limited to the first aspect, and may be applied to any of the second to tenth aspects.

A twelfth aspect is an aspect according to the first aspect, wherein a second restriction section having a second restriction surface configured to restrict a position of a second edge, which is an opposite side from the first edge of the medium.

The medium is moved to the first restriction surface side by the first transport belt and the second transport belt. However, for example, when the medium rotates so that the downstream end of the first edge is separated from the first restriction surface, there is a concern that the correction of the skew cannot be performed even when the medium is transported by a distance which can be transported by and the second transport belt. Note that this is merely an example, and there are cases where the medium may move a direction away from the first restriction surface without being rotated as described above. However, according to the present aspect, since the second restriction section configured to restrict the position of the second edge of the medium on the opposite side from the first edge of the medium is provided, it is possible to suppress the occurrence of the defects described above.

This aspect is not limited to the first aspect, and may be applied to any of the second to seventeenth aspects.

A thirteenth aspect is an aspect according to the twelfth aspect, wherein the second restriction section has an upstream second restriction section provided with respect to the first transport belt and a downstream second restriction section provided with respect to the second transport belt and the upstream second restriction section and the downstream second restriction section are configured to independently displace in the width direction.

In this case, since the upstream second restriction section and the downstream second restriction section are configured to independently displace in the width direction, the second edge can be restricted appropriately in accordance with the first direction and the second direction.

A recording system according to a fourteenth aspect of the present disclosure includes a recording device for recording on a medium; a feeding device disposed outside the recording device and configured to feed the medium to the recording device; and the relay transport device according to any one of the first to thirteenth aspects, the relay transport device being positioned between the recording device and the feeding device and configured to relay and transport the medium fed from the feeding device to the recording device.

According to this aspect, in the recording system, the operational effects of any one of the first to thirteenth aspects can be obtained.

A feeding system according to a fifteenth aspect feeds medium to a recording device for recording on the medium and includes a feeding device disposed outside the recording device and configured to feed the medium to the recording device and the relay transport device according to any one of the first to thirteenth aspects, the relay transport device being positioned between the recording device and the feeding device and configured to relay and transport the medium fed from the feeding device to the recording device.

According to the present aspect, in the feeding system, the operational effects of any one of the first to thirteenth aspects can be obtained.

Hereinafter, the present disclosure will be specifically described.

Hereinafter, a recording system 1, a medium supplying system 2, and a relay transport device 4 according to an embodiment of the present disclosure will be described.

In each drawing, an X-axis direction is a depth direction of each device, and is a width direction of a medium represented by a recording sheet. Among the X-axis directions, the +X direction is a direction from the device rear surface toward the device front surface, and the −X direction is a direction from the device front surface toward the device rear surface.

The Y-axis direction is the apparatus width direction of each device, and among the Y-axis directions, the +Y direction is the left direction as viewed from a user facing the device front surface, and the −Y direction is the right direction. The +Y direction is a transport direction of the medium in the relay transport device 4.

A Z-axis direction is a device height direction of each device and is a vertical direction, a +Z direction is a vertically upward direction, and a −Z direction is a vertically downward direction. In the following description, the +Z direction may be simply referred to as upward, and the −Z direction may be simply referred to as downward.

Hereinafter, a direction in which the medium is transported may be referred to as a transport direction or downstream of the transport direction, and a direction opposite to the transport direction may be referred to as upstream of the transport direction.

In FIG. 1, the transport path of the medium is indicated by dashed line. In the recording system 1, the medium is transported through the transport path indicated by dashed line.

Configurations of Recording System and Recording Device

In FIG. 1, a recording system 1 includes a recording device 3, a relay transport device 4, and a feeding device 5. The relay transport device 4 and the feeding device 5 constitute a medium supplying system 2. Therefore, the recording system 1 includes the recording device 3 and the medium supplying system 2.

The recording device 3, the relay transport device 4, and the feeding device 5 are independent devices, and are arranged side by side along the Y-axis direction on the installation surface G.

The recording device 3 is configured as an inkjet printer that performs recording by ejecting ink, which is an example of liquid, onto the medium, and includes a line head 105, which is an example of a recording section. Further, the recording device 3 is a so-called multifunction device including an image reading device 102 in an upper section of the device. However, the recording device 3 is not limited to an inkjet printer, and may be a device that performs recording by another method such as a laser printer, a thermal transfer printer, or a dot impact printer.

The recording device 3 is provided with a medium accommodation section 101 for accommodating the medium to be fed in a lower portion of a device main body 100, which is provided with the line head 105. The medium accommodation section 101 includes a plurality of medium accommodation cassettes along the vertical direction.

The device main body 100 includes a plurality of transport roller pairs (not shown) for transporting the medium, and the medium on which recording has been performed by the line head 105 is discharged to an in-body discharge section 103 and stacked on a discharge tray 104.

The device main body 100 is provided with a control section 111 for controlling the entire recording system 1. The control section 111 includes a CPU (not shown), a nonvolatile memory, and the like, and all the controls executed in the recording system 1 are realized by executing a control program held in the nonvolatile memory.

In the present embodiment, the control section 111 is provided in the recording device 3 and controls the relay transport device 4 connected to the recording device 3 and the feeding device 5 connected to the relay transport device 4. However, the relay transport device 4 and the feeding device 5 may include a control section for controlling each device, and the control section 111 of the recording device 3, the control section (not shown) of the relay transport device 4, and the control section (not shown) of the feeding device 5 may transport the medium in cooperation with each other.

The recording device 3 includes a feed roller 107 and a separation roller 108 as receiving rollers on the right side section of the device main body 100, and is configured to be able to receive a medium from the right side section of the device main body 100. The feed roller 107 is disposed at a predetermined height from the installation surface G. The relay transport device 4 (to be described later) supplies the medium to the feed roller 107.

In a case where the medium is received from the right side section of the device main body 100, the medium is sent to the registration roller pair 109 by the rotation of the feed roller 107 while being subjected to a separation action by the separation roller 108. At this time, the leading edge of the medium contacts against the registration roller pair 109 and a bend is formed in the medium between the registration roller pair 109 and the feed roller 107, and by this, the leading edge of the medium aligns with the registration roller pair 109 and skew is corrected.

Note that a feed tray (not shown) is pivotably provided on the right side surface of the device main body 100, and in a case where the relay transport device 4 (to be described later) is not installed, the medium can be placed on the feed tray, and the medium placed on the feed tray can be fed by the feed roller 107. When the relay transport device 4 (to be described later) is used, the feeding tray is removed and the relay transport device 4 is installed. The feed tray is provided so as to be able to take on a closed state, in which a right side surface of the device main body 100 is formed by pivoting, and an open state, in which the medium can be placed thereon, and since it is positioned at a position where it does not interfere with the relay transport device 4 in the open state, it is not always necessary to remove the feed tray when the relay transport device 4 (to be described later) is installed.

The relay transport device 4 is an apparatus that is positioned between the recording device 3 and the feeding device 5, which is arranged outside the recording device 3 and feeds the medium to the recording device 3, and that relays and transports the medium fed from the feeding device 5 to the feed roller 107 of the recording device 3.

The medium is supplied from the feeding device 5 to the relay transport device 4, and is transported to the feed roller 107 via the transport path Tk of the relay transport device 4. As will be described in detail later, skew of the medium is corrected in the transport path Tk.

The relay transport device 4 is placed on an installation base 6 so that a position at which the medium is supplied to the recording device 3 in the vertical direction matches the feed roller 107. A space 6*a* for allowing an opening and closing body 110, which is provided on the right side surface of the recording device 3, to open and close is formed on the lower side of the installation base 6. Accordingly, it is possible to prevent the installation base 6 from obstructing the opening and closing of the opening and closing body 110.

The opening and closing body 110 forms a part of the right side surface of the device main body 100, can open as indicated by a reference symbol 110-1 and two dot chain line, and can open the transport path of the medium from the medium accommodation section 101 to the device main body 100 by opening.

Configuration of Relay Transport Device

Next, a basic configuration of the relay transport device 4 will be described with reference to FIGS. 2 to 5B.

The relay transport device 4 includes a first restriction section 31 having a first restriction surface 31*a* that positions a first edge Ps1, which is one edge (edge in the +X direction) in the width direction of the medium supplied from the feeding device 5, and a transport section 10 that transports the medium toward the first restriction surface 31*a* in an intersecting direction D, which intersects the +Y direction, which is the transport direction, and the X-axis direction, which is the width direction.

Figure 2:
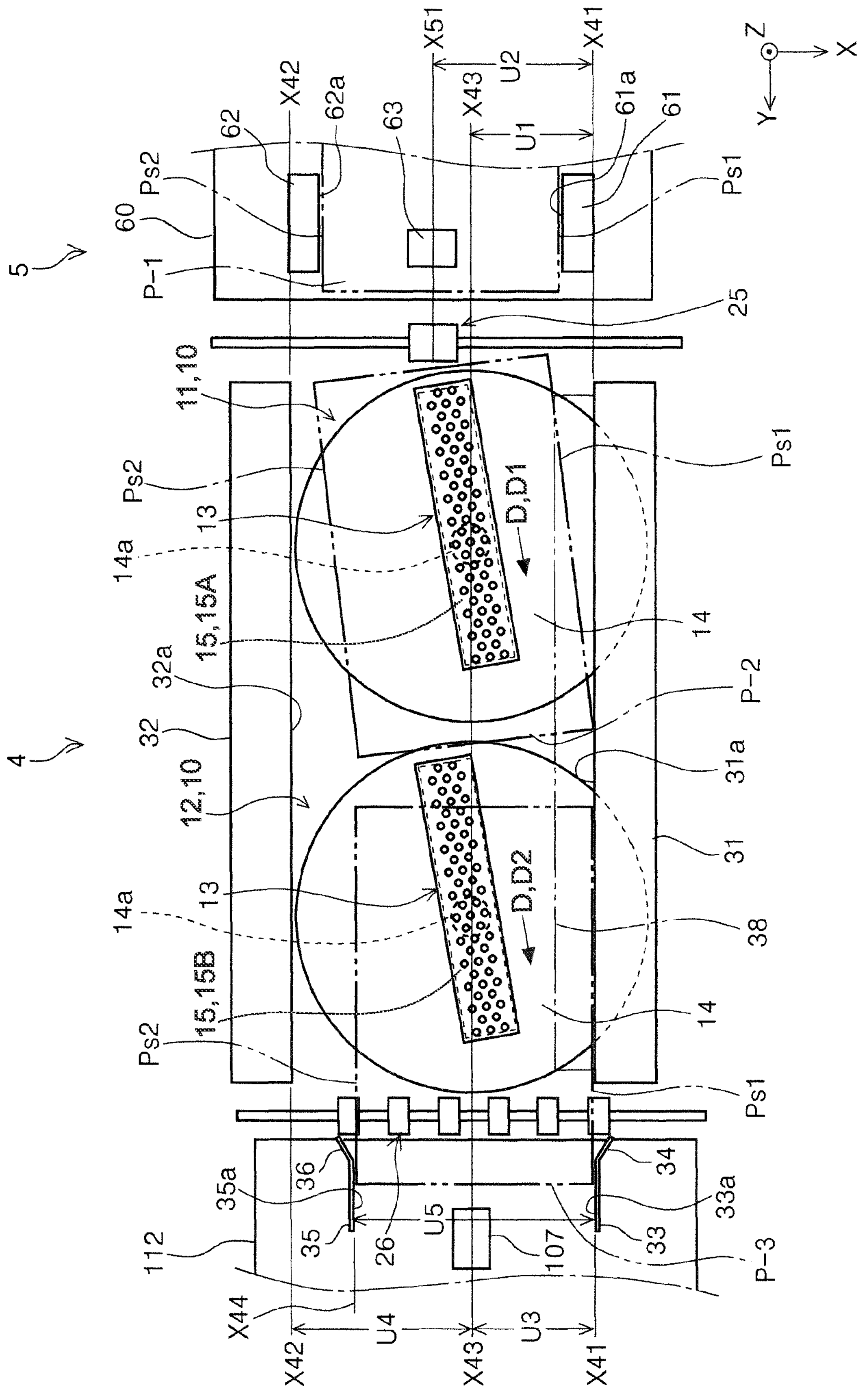
FIG. 2 is a plan view of a relay transport device, part of a recording device, and part of a feeding device.

In FIG. 2, a reference symbol P-2 and a reference symbol P-3 indicate an example of the medium to be transported, and the medium indicated by the reference symbol P-3 is obtained by correcting the skew of the medium indicated by the reference symbol P-2.

The first restriction surface 31*a* can contact against the first edge Ps1 of the medium, is parallel to the Y-axis direction, and extends along the Y-axis direction.

The first restriction section 31 is provided so as to be displaceable in the X-axis direction, that is, in the width direction of the medium while being guided by a guide section (not shown). In the present embodiment, the displacement of the first restriction section 31 in the width direction is performed by a manual operation of the user. However, it goes without saying that the displacement of the first restriction section 31 in the width direction may be performed by power of a motor or the like.

In the present embodiment, the transport section 10 includes a first transport section 11 and a second transport section 12 disposed downstream of the first transport section 11.

A direction in which the first transport section 11 transports the medium toward the first restriction section 31 is referred to as a first direction D1, and a direction in which the second transport section 12 transports the medium toward the first restriction section 31 is referred to as a second direction D2. The first direction D1 and the second direction D2 are both examples of the intersecting direction D. In the present embodiment, the second direction D2 is a direction along the first direction D1.

In the present embodiment, the basic configurations of the first transport section 11 and the second transport section 12 are the same, and each of the transport sections is provided with a belt unit 13 on a rotary table 14. The belt unit 13 includes a transport belt 15. However, hereinafter, the transport belt 15 included in the first transport section 11 may be referred to as a first transport belt 15A as necessary, and the transport belt 15 included in the second transport section 12 may be referred to as a second transport belt 15B as necessary.

The rotary table 14 supports the transported medium from below. The rotary table 14 is rotatable in a clockwise direction and a counterclockwise direction in FIG. 2 around a rotation shaft 14*a*, that is, the transport belt 15 is rotatable in plan view (as viewed from the +Z direction). By the rotation of the rotary table 14, the direction in which the transport belt 15 applies the transport force to the medium, that is, the intersecting direction D can be changed.

In the present embodiment, the transport belt 15 is provided upstream in the transport direction with respect to the rotation shaft 14*a* of the rotary table 14. Said differently, "the transport belt 15 is provided upstream in the transport direction with respect to the rotation shaft 14*a*" is a situation where the rotation shaft 14*a* is positioned downstream with respect to the center of the transport belt 15 in the transport direction, and "the rotation shaft 14*a* is positioned downstream with respect to the center of the transport belt 15 in the transport direction" means that the axial center position of the rotation shaft 14*a* is positioned downstream of the center position of the transport belt 15 in the transport direction.

The rotation of the rotary table 14 about the rotation shaft 14*a* is performed by the user operation in the present embodiment, but may be performed by, for example, a motor (not shown). The motor for rotating the rotary table 14 can be controlled by the control section 111 (see FIG. 1). In this case, a configuration may be adopted in which a dedicated motor is provided for each of the first transport section 11 and the second transport section 12, and each independently rotates the rotary table 14.

Figure 4:
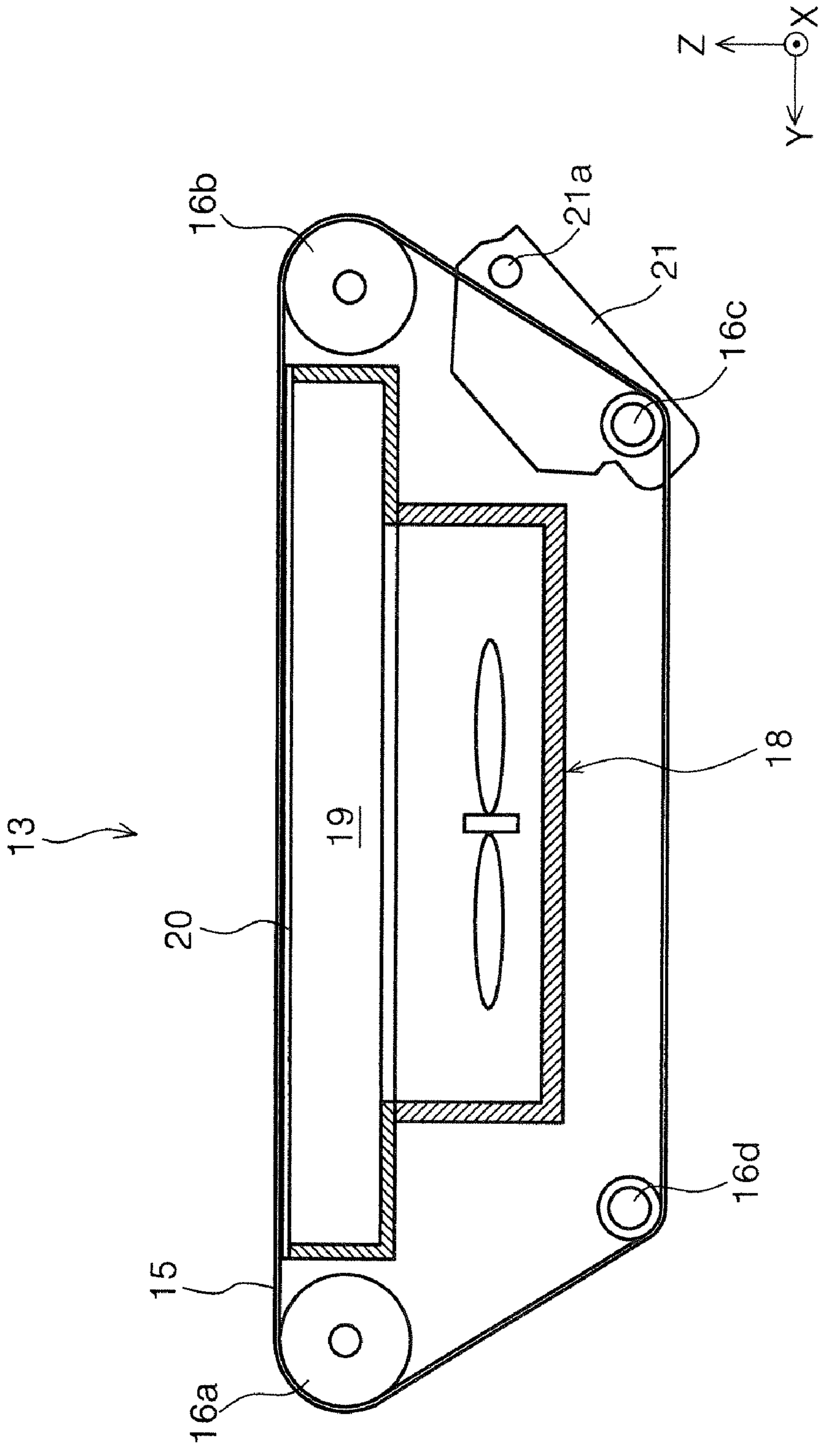
FIG. 4 is a side cross-sectional view of the belt unit.

The belt unit 13 includes a transport belt 15, and is configured to suck and transport the medium to the transport belt 15. More specifically, as shown in FIG. 4, the belt unit 13 includes drive pulley 16*a* and driven pulleys 16*b*, 16*c*, and 16*d*, and the transport belt 15 is wound around these pulleys. The drive pulley 16*a* is driven in the counterclockwise direction of FIG. 4 by a belt drive motor (not shown), and thus the transport belt 15 circulates in the counterclockwise direction in FIG. 4.

Note that the belt drive motor (not shown) may be provided for each of the first transport section 11 and the second transport section 12, or the first transport section 11 and the second transport section 12 may be driven by one belt drive motor.

The driven pulley 16*c* is supported by a pulley support member 21. The pulley support member 21 is provided so as to be rotatable in the clockwise direction and the counterclockwise direction in FIG. 4 around the rotation shaft 21*a*, and is pressed so as to rotate in the counterclockwise direction in FIG. 4 by a pressing member (not shown), for example, a spring. As a result, the driven pulley 16*c* applies tension to the transport belt 15.

A suction blower 18, which is an example of a suction section, is provided inside the transport belt 15. The suction blower 18 applies a negative pressure to the pressure chamber 19.

A suction plate 20 is provided above the pressure chamber 19. The suction plate 20 supports the transport belt 15 between the driven pulley 16*b* and the drive pulley 16*a*. A plurality of openings 20*a* are formed in the suction plate 20 as shown in FIG. 5B.

Figure 5A:
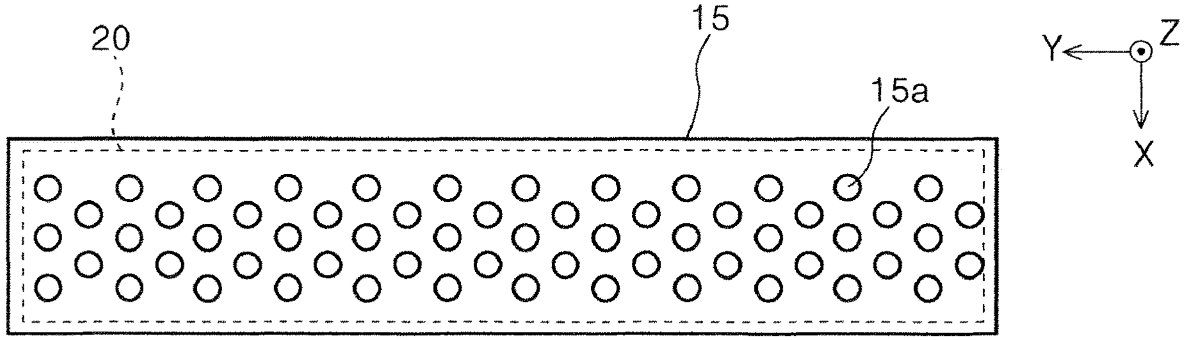
FIG. 5A is a plan view of a transport belt.
Figure 5B:
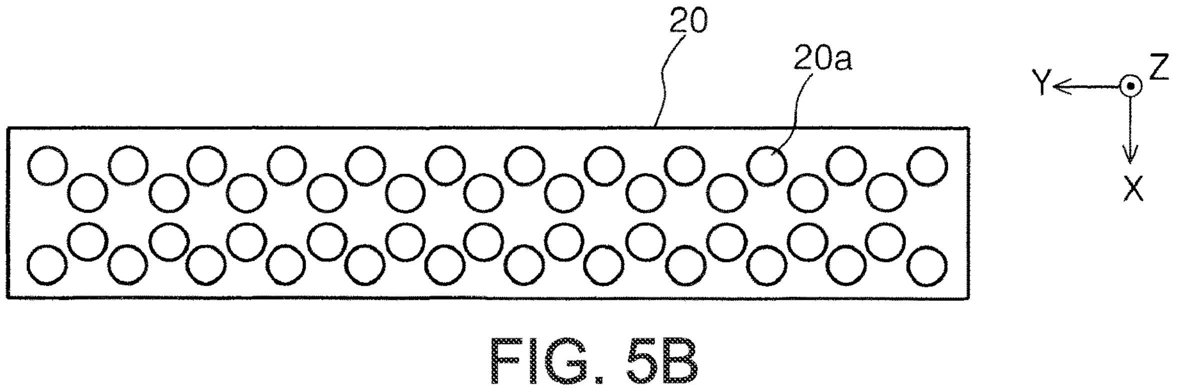
FIG. 5B is a plan view of a suction plate.

A plurality of through holes 15*a* are formed in the transport belt 15 as shown in FIG. 5A, and the through holes 15*a* of the transport belt 15 are configured capable of overlapping the openings 20*a* of the suction plate 20 according to the circulation operation of the transport belt 15. As a result, when the negative pressure is formed in the pressure chamber 19 by the suction blower 18, the medium is sucked via the openings 20*a* of the suction plate 20 and the through holes 15*a* of the transport belt 15, and the medium is transported in intimate contact with the transport belt 15.

The suction blower 18, which is an example of a suction section, is provided in each of the first transport section 11 and the second transport section 12 in the present embodiment. That is, since separate suction sections are provided for the first transport belt 15A and the second transport belt 15B, independent suction control can be performed for the first transport belt 15A and the second transport belt 15B.

However, instead of such a configuration, a single suction blower 18 may be used for the first transport section 11 and the second transport section 12.

Figure 6:
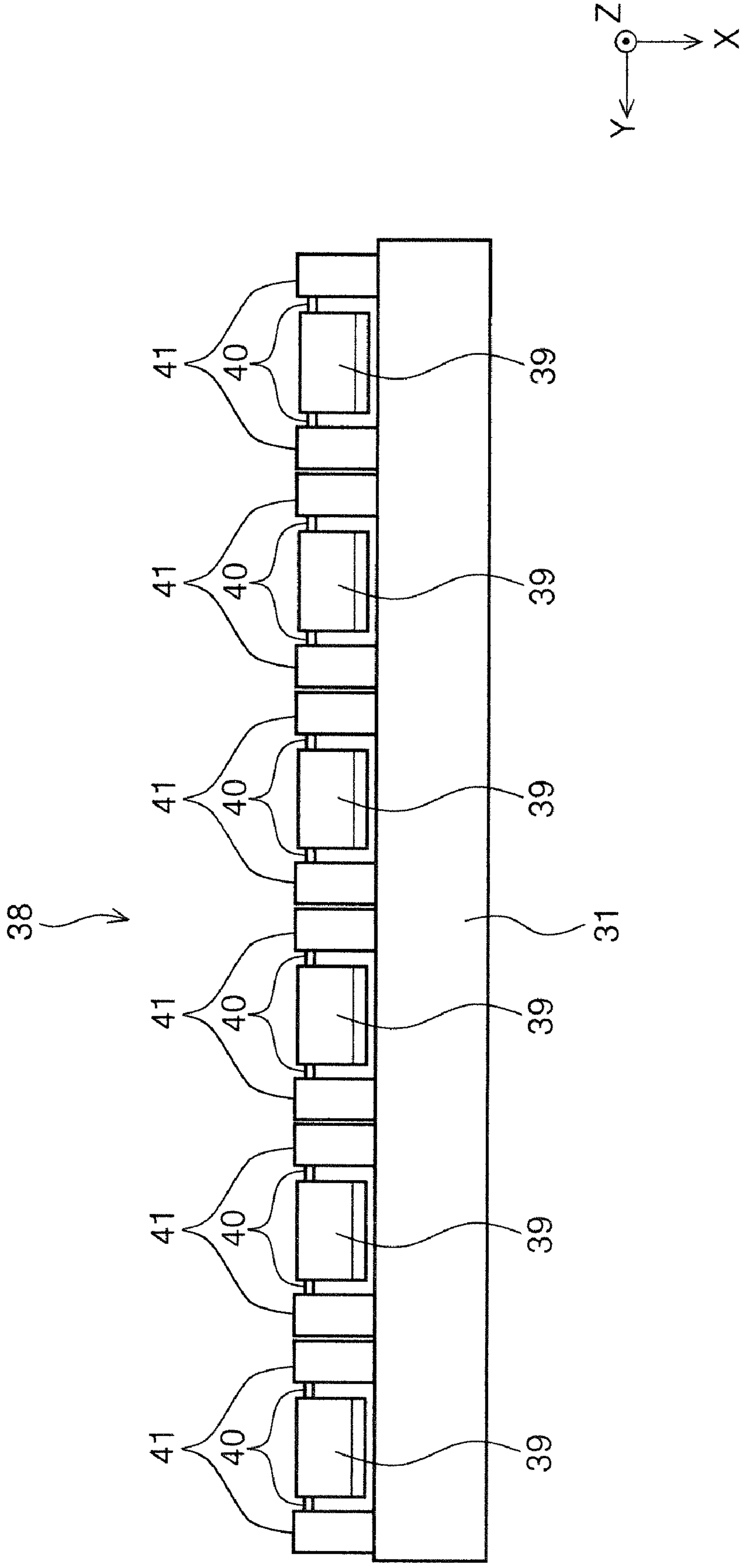
FIG. 6 is a plan view of an upper restriction section.

As shown in FIG. 2, the relay transport device 4 is provided with an upper restriction section 38 which suppresses floating of the first edge Ps1 of the medium in the −X direction with respect to the first restriction section 31. In FIG. 2, the upper restriction section 38 is shown in a simplified diagram, and the upper restriction section 38 will be described with reference to FIGS. 6 and 7.

In the present embodiment, the upper restriction section 38 includes a plurality of upper restriction members 39 along the transport direction. Support members 41 are provided on both sides of each upper restriction member 39 in the transport direction, and the upper restriction members 39 are provided rotatably with respect to the support members 41 via a rotation shaft 40. The upper restriction members 39 are rotatably provided as viewed from the transport direction, and are provided so as to be able to advance toward and retreat from the medium by rotating. The upper restriction members 39 are pressed by a pressing member (not shown), for example, a spring, in a counterclockwise direction in FIG. 7, that is, a direction in which the upper restriction members 39 are pressed into contact with the medium. The lower surface of the upper restriction members 39 serves as an upper restriction surface 39*a* that restricts the upward movement of the first edge Ps1 facing the first restriction surface 31*a*. The operation and effect of the upper restriction section 38 thus configured will be described later.

Figure 3:
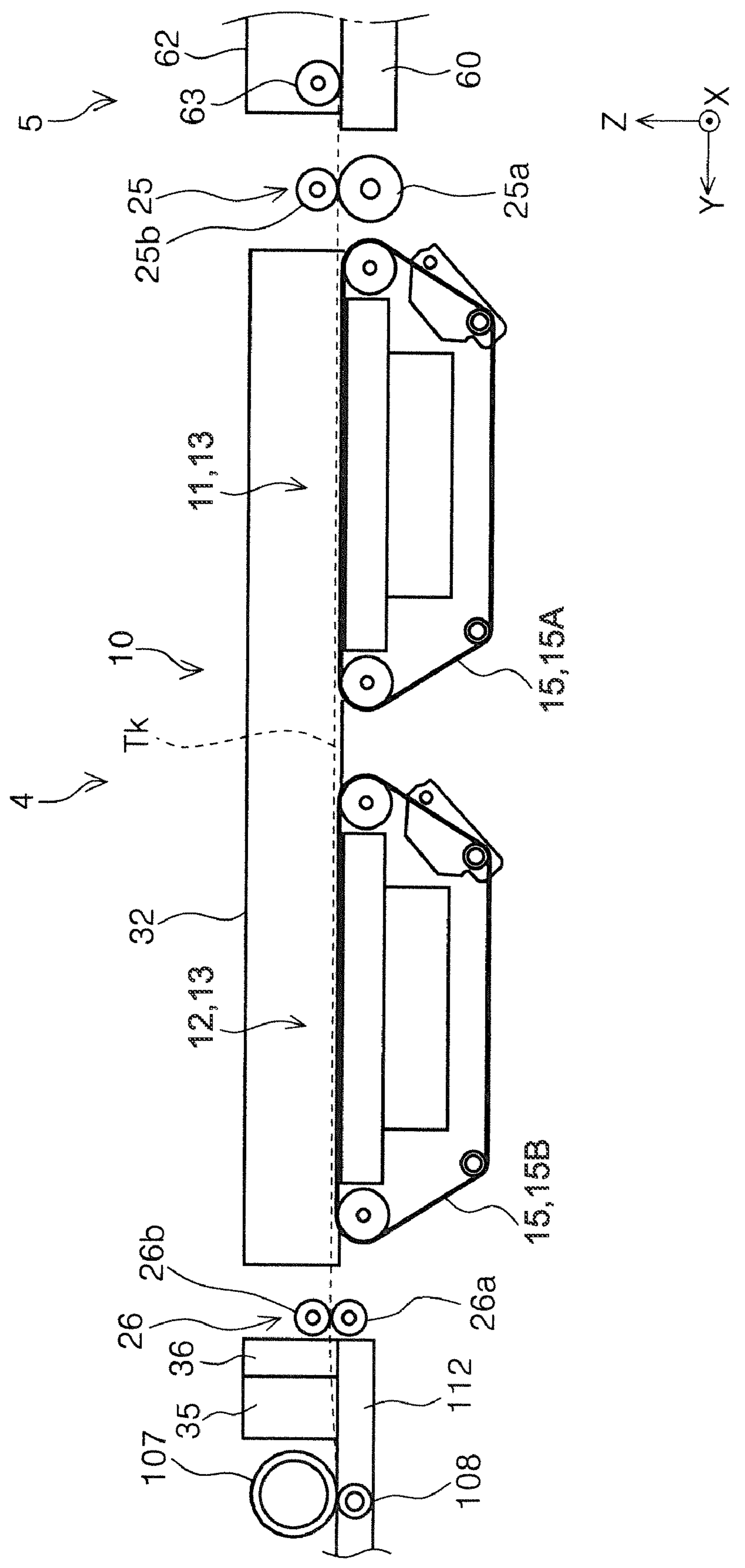
FIG. 3 is a side sectional view of the relay transport device, part of the recording device, and part of the feeding device.

As shown in FIG. 3, the relay transport device 4 includes a transport roller pair 25 upstream of the transport section 10. The transport roller pair 25 includes a drive roller 25*a* driven by a drive motor (not shown) and a driven roller 25*b* which can be driven to rotate. The drive motor is controlled by the control section 111 (see FIG. 1). The driven roller 25*b* can advance toward and retreat from the drive roller 25*a*, and is pressed toward the drive roller 25*a* by pressing member (not shown), for example, a spring.

In the present embodiment, one pair of the transport roller pair 25 is provided in the width direction as shown in FIG. 2. Although a plurality of transport roller pairs 25 may be provided along the width direction, a configuration in which one transport roller pair 25 is provided in the width direction as in the present embodiment is suitable from the viewpoint that the medium is easily rotated and damage to the medium is suppressed.

That is, the transport roller pair 25 applies a transport force to the medium in the transport direction, but since a transport force in the intersecting direction D, which intersects the transport direction and the width direction is applied to the medium in the transport section 10 downstream, the transport force by the transport roller pair 25 and the transport force by the transport section 10 are simultaneously applied to the medium, and damage such as wrinkles may occur in the medium. However, the configuration in which one transport roller pair 25 is provided in the width direction as in the present embodiment is suitable from the viewpoint that the medium is easily rotated and damage to the medium is suppressed.

Further, as shown in FIG. 3, the relay transport device 4 includes a discharge roller pair 26 downstream of the transport section 10. The discharge roller pair 26 includes a drive roller 26*a* which is driven by a drive motor (not shown) and a driven roller 26*b* which can be driven to rotate. The drive motor is controlled by the control section 111 (see FIG. 1). The driven roller 26*b* is movable back and forth with respect to the drive roller 26*a*, and is pressed toward the drive roller 26*a* by pressing member (not shown), for example, a spring.

In this embodiment, a plurality of discharge roller pairs 26 are provided in the width direction as shown in FIG. 2. Accordingly, it is possible to reliably supply the medium to the recording device 3 while suppressing the medium that has had skew corrected by the relay transport device 4 from becoming skewed again. However, it is not limited to this, and one discharge roller pair 26 may be provided in the width direction.

The drive motor serving as a driving source of the drive roller 26*a* may be the same as or different from the drive roller 25*a* of the transport roller pair 25.

It is desirable that a medium transport speed in the +Y direction by the transport section 10 is higher than a medium transport speed in the +Y direction by the transport roller pair 25 so that the medium does not become loose between the transport roller pair 25 and the transport section 10. Similarly, it is desirable that a medium transport speed in the +Y direction by the discharge roller pair 26 is higher than the medium transport speed in the +Y direction by the transport section 10 so that the medium does not become loose between the transport section 10 and the discharge roller pair 26.

Similarly, it is desirable that a medium transport speed in the +Y direction by the feed roller 107 is higher than the medium transport speed in the +Y direction by the discharge roller pair 26 so that the medium does not become loose between the feed roller 107 and the discharge roller pair 26 of the recording device 3.

In the present embodiment, as shown in FIG. 2, the relay transport device 4 includes a second restriction section 32 capable of restricting the position of a second edge Ps2 opposite side from the first edge Ps1 of the medium. The second restriction section 32 has a second restriction surface 32*a* capable of restricting the position of the second edge Ps2 by contacting the second edge Ps2 of the medium. The second restriction surface 32*a* is parallel to the Y-axis direction and extends along the Y-axis direction. In the present embodiment, the second restriction section 32 has a fixed structure that does not move in the width direction, but may be configured to be movable in the width direction.

In the present embodiment, the relay transport device 4 is provided with a first auxiliary guide 33, which is disposed downstream of the first restriction section 31 in the transport direction and which can restrict the position of the first edge Ps1 of the medium, and a second auxiliary guide 35, which is disposed on the opposite side of the first auxiliary guide 33 with the medium interposed therebetween and which can restrict the position of the second edge Ps2 of the medium.

The first auxiliary guide 33 includes a first auxiliary guide surface 33*a* that restricts the position of the first edge Ps1 of the medium. Further, the second auxiliary guide 35 includes a second auxiliary guide surface 35*a* that restricts the position of the second edge Ps2 of the medium. The first auxiliary guide surface 33*a* and the second auxiliary guide surface 35*a* extend along the transport direction.

The first auxiliary guide 33 and the second auxiliary guide 35 are positioned above a medium support section 112 constituting the recording device 3, and are provided so as to be displaceable in a direction approaching each other or separating from each other along the width direction via a rack and pinion mechanism (not shown). The medium support section 112 supports the medium at the position of the feed roller 107 in the medium transport path.

In the present embodiment, the first auxiliary guide 33 is connected to the first restriction section 31 via a connecting section (not shown), and when the first restriction section 31 is displaced in the width direction, the first auxiliary guide 33 is also displaced integrally in the width direction. In conjunction with the displacement of the first auxiliary guide 33, the second auxiliary guide 35 is also displaced in the width direction.

The distance U5 between the first auxiliary guide surface 33*a* and the second auxiliary guide surface 35*a* in the width direction is shorter than the distance (U3+U4) between the first restriction surface 31*a* and the second restriction surface 32*a*.

The first auxiliary guide 33 includes, at an upstream end in the transport direction, a medium receiving section 34 that widens in a direction (+X direction) away from the first edge Ps1 of the medium with progression upstream in the transport direction. The second auxiliary guide 35 includes, at the upstream end in the transport direction, a medium receiving section 36 that widens in a direction (−X direction) away from the second edge Ps2 of the medium with progression upstream in the transport direction.

Configuration of Feeding Device

Next, the feeding device 5 includes a stacking section 60 on which the medium is stacked, and a feed roller 63 as a feeding section that feeds the medium from the stacking section 60. A reference symbol P-1 indicates an example of the medium stacked on the stacking section 60.

As shown in FIG. 2, the feeding device 5 according to the present embodiment includes a first feeding guide 61 having a first feeding guide surface 61*a* which positions the first edge Ps1 of the medium, and a second feeding guide 62 having a second feeding guide surface 62*a* which positions the second edge Ps2 of the medium.

The first feeding guide 61 and the second feeding guide 62 are provided displaceable in a direction of approaching each other or separating from each other along the width direction via a rack and pinion mechanism (not shown). The user who sets the medium on the stacking section 60 can displace the first feeding guide 61 and the second feeding guide 62 to a position suitable for a medium size by operating the first feeding guide 61, for example.

The feed roller 63 is driven in the clockwise direction of FIG. 3 by a motor (not shown). The motor that drives the feed roller 63 is controlled by the control section 111 (see FIG. 1). The feed roller 63 may be provided so as to be switchable between a state of being in contact with the medium stacked on the stacking section 60 and a state of being separated from the medium stacked on the stacking section 60. Such a state switching operation of the feed roller 63 can be realized by a motor (not shown). The motor can be controlled by the control section 111 (see FIG. 1).

The feed roller 63 is disposed at a second center position X51 (to be described later) in the width direction.

In FIG. 2, a position X43 is a recording reference position in the width direction of the medium in the recording device 3, and is a position that is the center in the width direction of the medium regardless of the medium size, and coincides with the center of the width direction in a state in which the first edge Ps1 of the medium is along the first restriction surface 31*a*. Hereinafter, this is referred to as a first center position X43. The position X51 is a center position in the widthwise direction of the medium (P-1) stacked on the stacking section 60, and is referred to as the second center position X51. The position X41 is a position in the width direction of the first restriction surface 31*a* of the first restriction section 31.

The distance U2 between the second center position X51 and the first restriction surface 31*a* in the width direction is longer than the distance U1 between the first center position X43 and the first restriction surface 31*a*.

The position X41 changes according to the width direction medium size, but the first center position X43 is positioned in the +X direction from the second center position X51 regardless of the width direction medium size.

Operation and Effect of Relay Transport Device

Since the relay transport device 4 includes the first restriction section 31 having the first restriction surface 31*a* for positioning the first edge Ps1 of the medium fed from the feeding device 5 and the transport section 10 for transporting the medium in the intersecting direction D toward the first restriction surface 31*a*, even if the medium fed from the feeding device 5 is skewed, the skew is corrected by the first edge Ps1 contacting the first restriction surface 31*a* by the transport section 10. The medium P-2, which is skewed when supplied from the feeding device 5 to the relay transport device 4, receives transport force in the intersecting direction D from the transport section 10, the first edge Ps1 contacts on the first restriction surface 31*a*, and the first edge Ps1 enters a state of being aligned with the first restriction surface 31*a*, and thus, the skew of the medium is corrected as indicated by reference symbol P-3. Further, by such correction of skew, the position of the medium in the width direction becomes less likely to vary compared with a configuration in which the skew is corrected by bringing the leading edge of the medium into contact with the roller pair. As described above, appropriate recording can be performed in the recording device 3.

The recording device 3 is provided with the registration roller pair 109 for performing skew correction by bringing the leading edge of the medium supplied from the relay transport device 4 into contact therewith, and skew correction is performed by different means between the recording device 3 and the relay transport device 4, and the skew of the medium is appropriately corrected. In other words, it may be difficult to align the position of the medium in the width direction only by the registration roller pair 109 provided in the recording device 3, and the skew of the medium is appropriately corrected by the skew correction in the relay transport device 4.

In the present embodiment, since the transport belt 15 is configured to suck and transport the medium and bring the medium into contact with the first restriction section 31, the medium is easily rotated compared to a configuration in which the medium is nipped and transported by the roller pair, and thus it is possible to appropriately correct the skew of the medium.

In the present embodiment, the medium is sucked against the transport belt 15 by air, but the medium may be caused to electrostatically cling to the transport belt 15.

Further, in the present embodiment, since the skew of the medium is corrected by at least two transport belts of the first transport belt 15A and the second transport belt 15B, the transport distance to correct the skew of the medium can be secured, and the skew of the medium can be appropriately corrected.

If the transport distance for correcting the skew of the medium were to be secured by one transport belt, then the distance in the widthwise direction between the first restriction surface 31*a* and the transport belt would be long upstream in the transport direction, and the force for pressing the first edge Ps1 against the first restriction surface 31*a* would be weak. If the inclination angle of the transport belt with respect to the transport direction were made small in order to suppress such a problem, the effect of correcting the skew would be reduced, so that the transport distance would need to be lengthened, resulting in an increase in the size of the device. However, by correcting the skew of the medium using at least two transport belts, i.e., the first transport belt 15A and the second transport belt 15B, the first edge Ps1 can be appropriately pressed against the first restriction surface 31*a*, thereby suppressing an increase in the size of the device.

It goes without saying that three or more transport belts may be provided along the transport direction.

In the present embodiment, it is possible to stably transport the medium because the second direction D2, which is the direction in which the second transport section 12 transports the medium toward the first restriction section 31, is a direction along the first direction D1, which is the direction in which the first transport section 11 transports the medium toward the first restriction section 31.

In the present embodiment, since the first direction D1 and the second direction D2 can be changed, appropriate skew correction can be performed.

In addition, in the present embodiment, since the first restriction section 31 is movable in the width direction, it is possible to correct the skew of a plurality of types of medium having different sizes in the width direction.

In addition, in the present embodiment, since the rotary table 14, that is, the transport belt 15 can change the intersecting direction D by the rotation of the rotation shaft 14*a*, it is possible to perform more appropriate skew correction by changing the intersecting direction according to the quality of the skew correction of the medium.

The rotation of the transport belt 15 around the rotation shaft 14*a* may be performed by a power of the motor (not shown) under the control of the control section 111 (see FIG. 1). In this case, change in the intersecting direction D may be controlled in accordance with the medium size or a medium type. For example, the lower the rigidity of the medium, the more likely that bending will occur when the first edge Ps1 comes into contact with the first restriction section 31, so that skew is less likely to be corrected or the medium is more likely to be damaged, so it is desirable that the angle formed by the transport direction (Y-axis direction) and the intersecting direction D be set smaller in accordance with lower rigidity of the medium.

As described above, when the transport force in the +Y direction by the transport roller pair 25 and the transport force in the intersecting direction D by the transport section 10 are applied to the medium at the same time, the medium may be damaged such as by wrinkling. Therefore, the angle formed by the transport direction (Y-axis direction) and the intersecting direction D may be made smaller in accordance with longer length of the medium in the transport direction.

The crossing direction D may be changed during transport of the medium, and for example, the angle formed by the transport direction (Y-axis direction) and the intersecting direction D may be increased as the transport of the medium proceeds. This makes it possible to appropriately correct the skew while suppressing the above described damage.

In the present embodiment, since the rotation center of the transport belt 15 is downstream of the transport belt 15 in the transport direction, the following operational effects are obtained. Hereinafter, this operation and effect will be described below with reference to FIGS. 8A and 8B. Note that, of the configuration shown in FIG. 2, only that necessary for description may be shown, and may be simplified as appropriate, in FIG. 8A and the subsequent drawings.

Figure 8A:
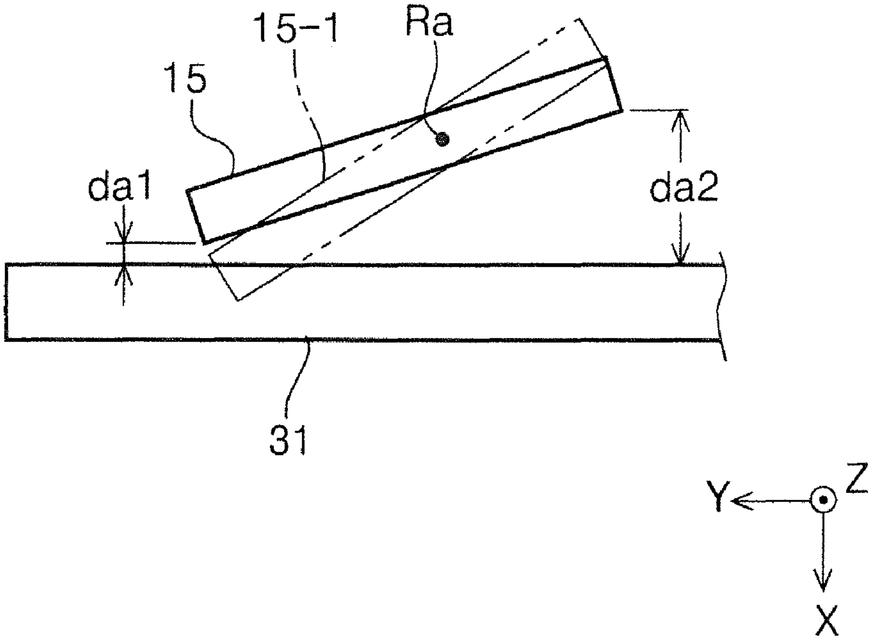
FIG. 8A is a plan view of a configuration in which a rotation center of the transport belt is upstream in the transport direction.
Figure 8B:
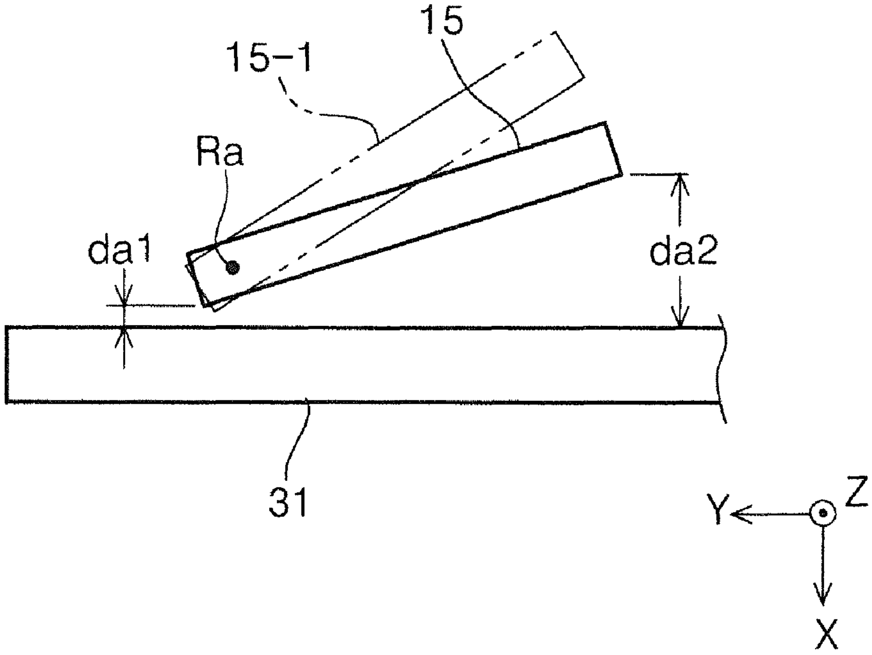
FIG. 8B is a plan view of a configuration in which the rotation center of the transport belt is downstream in the transport direction.

FIG. 8A shows, as a comparative example, a case where a rotation center Ra when the transport belt 15 rotates is upstream of the transport belt 15 in the transport direction. Since the transport belt 15 transports the medium toward the first restriction section 31, a distance da1 between a downstream end of the transport belt 15 and the first restriction section 31 in the width direction is shorter than a distance da2 between an upstream end of the transport belt 15 and the first restriction section 31. For this reason, when the transport belt 15 rotates in plan view in order to change the intersecting direction D, there is a concern that the downstream end of the transport belt 15 and the first restriction section 31 interfere with each other, and this limits the rotatable range of the transport belt 15, so that the adjustment range in the intersecting direction would is narrowed. The transport belt 15 indicated by the reference symbol 15-1 and two dot chain line in FIGS. 8A and 8B is rotated from the transport belt 15 indicated by solid line by 15° in the counterclockwise direction of the drawing. In the case of FIG. 8A, the downstream end of the transport belt 15 interferes with the first restriction section 31. In order to bring the first edge Ps1 of the medium into contact with the first restriction surface 31*a*, the upper surface of the transport belt 15 needs to be positioned above (+Z direction) the lower end section of the first restriction surface 31*a* in the height direction (Z-axis direction) of the first restriction surface 31*a*, so a configuration in which the downstream end of the transport belt 15 interferes with the first restriction section 31 in the plan view as shown in FIG. 8A cannot be adopted.

However, in the present embodiment, the rotation center Ra of the transport belt 15 is positioned downstream of the transport belt 15 in the transport direction, so the swing range of the downstream end when the transport belt 15 rotates can be made narrower than the swing range of the upstream end, thereby making it difficult for the downstream end of the transport belt 15 to interfere with the first restriction section 31 as shown in FIG. 8B. Therefore, the rotatable range of the transport belt 15 can be expanded, and the adjustable range in the intersecting direction D can be expanded.

In the present embodiment, the second restriction section 32 having the second restriction surface 32*a* capable of restricting the position of the second edge Ps2 of the medium is provided. As a result, the following effects can be obtained. That is, the medium is moved to the side of the first restriction surface 31*a* by the transport belt 15. However, as an example, when the medium rotates so that the downstream end of the first edge Ps1 is separated from the first restriction surface 31*a*, there is a concern that the correction of the skew cannot be performed even when the medium is transported by a distance transportable by the transport belt 15. Note that this is merely an example, and there are cases where the medium may move in a direction away from the first restriction surface 31*a* without being rotated as described above. The movement of the medium in the direction away from the first restriction surface 31*a* can also be caused by the medium receiving a reaction force from the first restriction surface 31*a* when contacting the first restriction surface 31*a*. However, in the present embodiment, since the second restriction section 32 capable of restricting the position of the second edge Ps2 of the medium is provided, it is possible to suppress the occurrence of the defects described above.

Further, in the present embodiment, as shown in FIG. 2, the second distance U4 between the first center position X43 and the position X42 of the second restriction surface 32*a* in the width direction is longer than the first distance U3 between the first center position X43 and the position X41 of the first restriction surface 31*a*. Accordingly, it is possible to appropriately receive the skewed medium from the feeding device 5.

Although the position X41 varies depending on the size of the medium in the width direction, the position of the second restriction section 32 in the width direction is set such that the second distance U4 is longer than the first distance U3 even when the widest medium recordable by the recording device 3 is transported.

Figure 7:
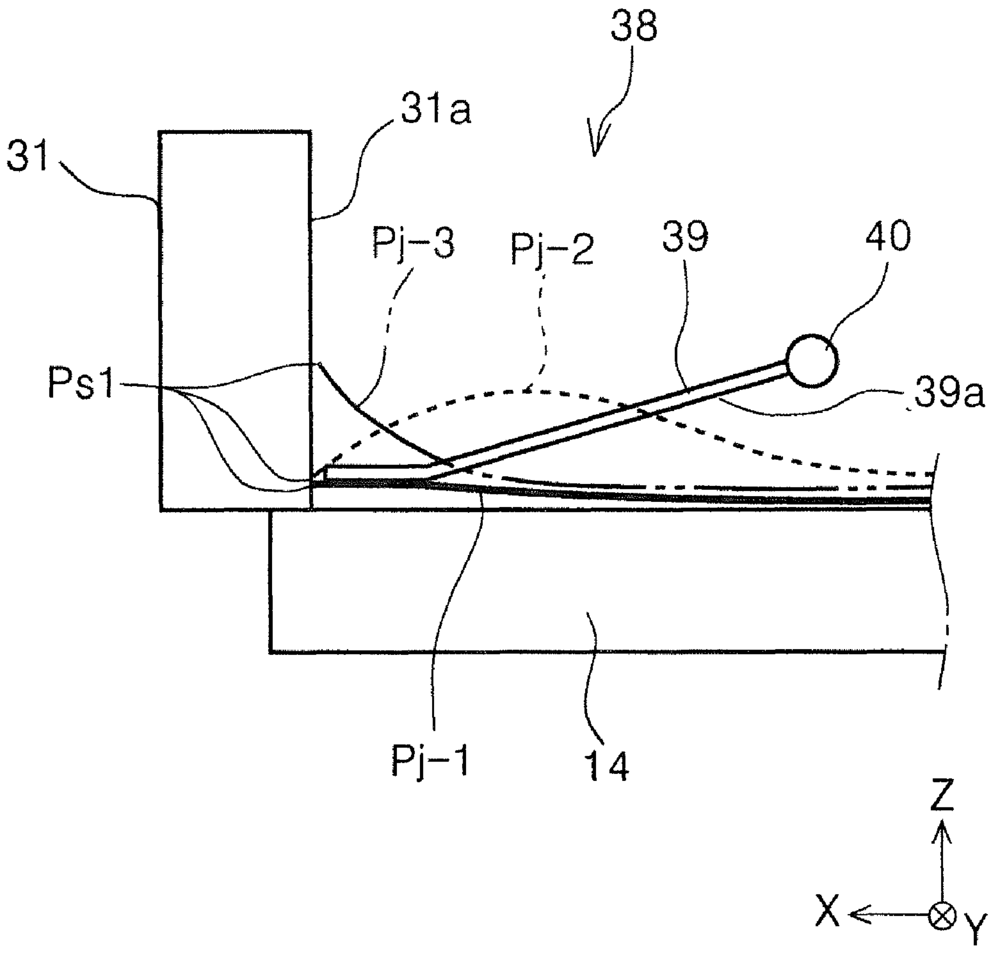
FIG. 7 is a view of the upper restriction section as viewed in a transport direction.

In the present embodiment, since the upper restriction members 39 (upper restriction surface 39*a*) are provided as the upper restriction section 38 which restricts the upward movement of the medium, the following operation and effect are obtained. That is, in case where the first edge Ps1 of the medium comes into contact with the first restriction surface 31*a*, if the medium deforms, the medium will not rotate, and there is a concern that the skew of the medium cannot be appropriately corrected, and there is also a concern that a jam occurs. In FIG. 7, reference symbol Pj-3 is an example of medium wherein the first edge Ps1 deformed or curled upward so as to move up the first restriction section 31. In FIG. 7, reference symbol Pj-2 is an example of the medium wherein a side end portion including the first edge Ps1 deformed or curled downward. Regardless of whether the medium is Pj-2 or Pj-3, there is a possibility that the medium cannot be appropriately rotated due to the deformation.

However, in the present embodiment, since the upper restriction surface 39*a* which restricts the upward movement of the medium is provided, the first edge Ps1 can appropriately come into contact with the first restriction surface 31*a* as in the medium indicated by the reference symbol Pj-1, and thus the skew can be corrected by appropriately rotating the medium.

Since the upper restriction members 39 forming the upper restriction surface 39*a* are rotatably provided so that the upper restriction surface 39*a* can advance toward and retreat from the medium, it is possible to suppress damage from being formed on the medium due to the upper restriction members 39 rotating when receiving a strong reaction force from the medium. The upper restriction members 39 are pressed by a pressing member (not shown), for example, a spring, in a direction in which the upper restriction surface 39*a* advances toward the medium. Accordingly, it is possible to suppress the upper restriction members 39 from being easily rotated when the upper restriction members 39 receive the reaction force from the medium, and thus it is possible to appropriately correct the skew of the medium.

In the present embodiment, since the plurality of upper restriction members 39 are provided along the transport direction, it is possible to restrict the upward movement of the medium in a wider range along the transport direction.

Since the plurality of upper restriction members 39 are provided along the transport direction, even in a case where the degree of upward movement of the medium different depends on the position in the transport direction, the upper restriction surface 39*a* can be displaced according to the position in the transport direction, and thus it is possible to suppress damage from being formed on the medium due to the medium coming into strong contact with the upper restriction surface 39*a*.

From the viewpoint of suppressing excessive pressing of the medium, it is desirable that the upper restriction members 39 form a predetermined gap between the upper restriction members 39 and the rotary table 14 that supports the medium from below, and can maintain the state. It is desirable that the predetermined gap is, for example, a value obtained by adding a predetermined margin to the maximum value of the thickness of the medium per sheet.

Further, the upper restriction members 39 may have a fixed structure which does not advance toward and retreat from the medium. Further, when the plurality of upper restriction members 39 are provided along the transport direction, the predetermined gap may be different among the plurality of upper restriction members 39. For example, the predetermined gap may be made smaller downstream where the skew of the medium is corrected than upstream.

Further, instead of the configuration in which the plurality of upper restriction members 39 are provided at appropriate intervals along the transport direction, one upper restriction member extending along the transport direction may be used.

In this embodiment, as shown in FIG. 2, it is configured so that the distance U2 in the width direction between the second center position X51 and the first restriction surface 31*a* is longer than the distance U1 between the first center position X43 and the first restriction surface 31*a*. Accordingly, it is possible to suppress the medium from being caught on the first restriction section 31 when the medium is supplied from the feeding device 5 to the relay transport device 4.

In the present embodiment, the first feeding guide 61 and the second feeding guide 62 are members which are displaced by the user according to the size of the medium in the width direction, and the first restriction section 31 is also a member which is displaced by the user according to the size of the medium in the width direction. Therefore, in the present embodiment, the first feeding guide 61 and the first restriction section 31 are connected to each other by a connecting member (not shown) so that the distance U2 is longer than the distance U1, and the first feeding guide 61 and the first restriction section 31 are configured to be integrally displaced. However, even when the first feeding guide 61 and the first restriction section 31 are not connected by the connecting member (not shown), the distance U2 can be made longer than the distance U1 if, as an example, the movable region of the first feeding guide 61 is set in the −X direction with respect to the movable region of the first restriction section 31.

In a configuration in which the first feeding guide 61 and the first restriction section 31 are not connected, a detection member for detecting the position of the first restriction section 31 in the width direction and a detection member for detecting the position of the first feeding guide 61 in the width direction are provided, and when the distance U2 is equal to or less than the distance U1 based on the detection information of the two detection members, the control section 111 (see FIG. 1) can place the medium feeding operation on hold and display an alert to that effect on a display section (not shown) provided in the recording device 3.

In a case where the first restriction section 31 is configured to be displaced by the power of a motor (not shown) under a control of the control section 111 (refer to FIG. 1), the position of the first restriction section 31 may be controlled such that the distance U2 is longer than the distance U1 according to the medium size recognized by the control section 111. In this case, in order to detect that the first feeding guide 61 is at an appropriate position corresponding to the medium size, it is also desirable to provide the detection member that detects the position of the first feeding guide 61 in the width direction. When the control section 111 determines that the first feeding guide 61 is not at the appropriate position corresponding to the medium size based on the detection information of the detection member, it can put the medium feeding operation on hold and display the alert to that effect on the display section (not shown) included in the recording device 3.

In the present embodiment, the feed roller 63, which is the feeding section of the feeding device 5, can feed the medium by coming into contact with the second center position X51 of the medium in the width direction. Accordingly, it is possible to suppress skew of the medium which is fed from the feeding device 5.

In the present embodiment, the feeding device 5 includes the first feeding guide 61 which positions the first edge Ps1 of the medium, and the first feeding guide surface 61*a* of the first feeding guide 61 is positioned between the first restriction surface 31*a* of the first restriction section 31 and the first center position X43 in the width direction. Accordingly, it is possible to suppress the position of the first edge Ps1 of the medium (P-1) fed from the feeding device 5 from being close to the first restriction section 31, and it is possible to suppress the medium from being caught on the first restriction section 31 when the medium is supplied from the feeding device 5 to the relay transport device 4.

The distance between the first restriction surface 31*a* and the first feeding guide surface 61*a* in the width direction does not become longer than necessary, and the medium can appropriately contact the first restriction section 31 after being supplied from the feeding device 5 to the relay transport device 4, and thus the skew of the medium can be appropriately corrected.

In the present embodiment, since the feeding device 5 is further provided with the second feeding guide 62 having the second feeding guide surface 62*a* which can restrict the position of the second edge Ps2 of the medium, it is possible to suppress skew of the medium fed from the feeding device 5. In FIG. 2, since the second center position X51 is at an intermediate position between the first feeding guide surface 61*a* of the first feeding guide 61 and the second feeding guide surface 62*a* of the second feeding guide 62 in the width direction, it is possible to more favorably suppress skew of the medium fed from the feeding device 5.

Note that even in a configuration in which the first feeding guide 61 and the second feeding guide 62 are not provided, the medium can be sent out from the stacking section 60 as long as the stacking section 60 and the feed roller 63 are provided.

In the present embodiment, the medium of which the skew was corrected by the first restriction section 31 is supplied to the recording device 3 in a state of being interposed between the first auxiliary guide 33 and the second auxiliary guide 35 in the width direction. Thus, skew of the medium when the medium is supplied from the relay transport device 4 to the recording device 3 is suppressed, and the medium can be supplied to the recording device 3 in a state in which the skew correction effect in the relay transport device 4 is appropriately maintained.

In the present embodiment, since the first auxiliary guide 33 includes the medium receiving section 34 at the upstream end in the transport direction, it is possible to suppress the medium from being caught on the first auxiliary guide 33. Since the second auxiliary guide 35 includes the medium receiving section 36 at the upstream end in the transport direction, it is possible to suppress the medium from being caught on the second auxiliary guide 35.

In the present embodiment, the first restriction section 31, the first auxiliary guide 33, and the second auxiliary guide 35 are movable in the width direction. Accordingly, the skew can be appropriately corrected in accordance with the medium size in the width direction.

The first restriction section 31 and the first auxiliary guide 33 are integrally movable in the width direction. Thus, it is possible to prevent the first restriction section 31 and the first auxiliary guide 33 from being displaced in the width direction, and it is possible to suppress the medium from being caught on the first auxiliary guide 33 when the medium moves from the first restriction section 31 to the first auxiliary guide 33.

However, the first restriction section 31 and the first auxiliary guide 33 are not limited to being integrated, and may be separate bodies.

In the present embodiment, the distance U5 between the first auxiliary guide surface 33*a* and the second auxiliary guide surface 35*a* in the width direction is shorter than the distance (U3+U4) between the first restriction surface 31*a* and the second restriction surface 32*a*. Accordingly, it is possible to suitably suppress skew when the medium is supplied from the relay transport device 4 to the recording device 3.

MODIFICATION EXAMPLE OF RELAY TRANSPORT DEVICE

The above described relay transport device 4 can be modified into the following Modification example 1 to Modification example 13. The modifications described below may be combined in any manner as long as there is no technical contradiction.

Modification Example 1

In the above described embodiment, displacement of the first restriction section 31 in the width direction is performed by a manual operation of the user. However, for example, a configuration may be adopted in which the first restriction section 31 is displaced in the width direction using a rack and pinion mechanism (not shown) driven by a motor (not shown). The motor for displacing the first restriction section 31 can be controlled by the control section 111 (see FIG. 1). Since the control section 111 can recognize the medium size based on the print data, it is possible to displace the first restriction section 31 to an appropriate position according to the medium size.

Modification Example 2

The transport belt 15 may be configured to be movable in the width direction in conjunction with the movement of the first restriction section 31. For example, in the above described embodiment, by integrally configuring the transport section 10 and the first restriction section 31, it is possible to move the transport belt 15 in the width direction in conjunction with the movement of the first restriction section 31.

As a result, the following effects can be obtained. That is, when the distance between the transport belt 15 and the first restriction surface 31*a* in the width direction is long, there is a possibility that the first edge Ps1 of the medium cannot be appropriately brought into contact with the first restriction surface 31*a* by the transport belt 15. On the other hand, when the distance between the transport belt 15 and the first restriction surface 31*a* in the width direction is short, in a case where the medium has a large size in the width direction, then a region which deviates from the transport belt 15 in the −X direction increases, and as a result, there is a concern that the medium cannot be appropriately transported. Therefore, in order to appropriately transport the medium while appropriately correcting the skew of the medium, the distance between the transport belt 15 and the first restriction surface 31*a* in the width direction is important. However, by making the transport belt 15 movable in the width direction in conjunction with the movement of the first restriction section 31, it is possible to appropriately maintain the distance between the transport belt 15 and the first restriction surface 31*a* in the width direction, and thus it is possible to appropriately correct the skew of the medium and appropriately transport the medium.

Modification Example 3

Figure 9:
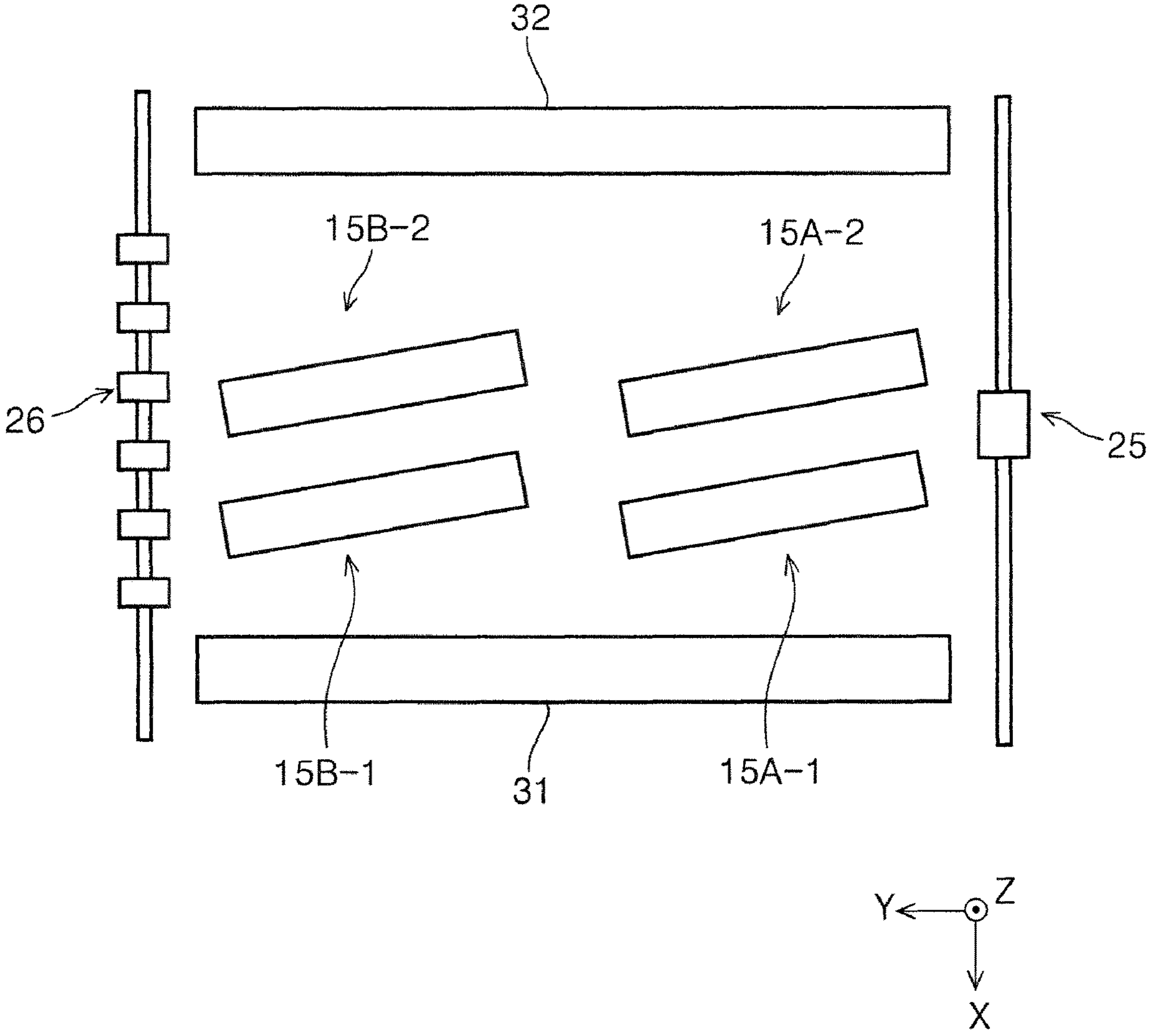
FIG. 9 is a plan view of a configuration in which a plurality of transport belts are provided in a width direction.

A plurality of transport belts 15 may be provided in the width direction. FIG. 9 shows an example thereof, in which the upstream first transport section 11 has a first transport belt 15A-1 and a first transport belt 15A-2, and the downstream second transport section 12 has a second transport belt 15B-1 and a second transport belt 15B-2. By providing the plurality of transport belts 15 in the width direction in this manner, it is possible to appropriately transport the medium having a large size in the width direction. When a plurality of transport belts 15 are provided in the width direction, they are not limited to two in the transport direction as shown in FIG. 9, and it goes without saying that three or more transport belts 15 may be provided in the transport direction.

In a case where the plurality of transport belts 15 are provided in the width direction, the suction force for sucking the medium by each transport belt 15 may be set to be weaker.

Modification Example 4

In FIG. 2, the difference between the first distance U3 and the second distance U4 may be made variable by providing the second restriction section 32 so as to be movable along the widthwise direction. As a result, the difference between the first distance U3 and the second distance U4 can be adjusted according to the degree of skew of the medium received from the feeding device 5, and more appropriate skew correction can be performed. The greater the difference between the first distance U3 and the second distance U4, the larger the degree of medium skew that can be received, and the smaller the difference between the first distance U3 and the second distance U4, the more easily that the medium can be regulated between the first restriction section 31 and the second restriction section 32, so that the position in the width direction is more easily determined, and skew can be suppressed.

More specifically, the second distance U4 is desirably as short as possible in order to appropriately correct the skew of the medium, because the distance in the transport direction in which the medium can be transported by the transport belt 15 is limited. However, if the second distance U4 is shortened, the medium cannot be appropriately received when the degree of skew of the medium received from the feeding device 5 is large. Therefore, it is possible to perform more appropriate skew correction by adjusting the difference between the first distance U3 and the second distance U4 according to the skew of the medium received from the feeding device 5.

The movement of the second restriction section 32, that is, the change of the second distance U4 may be manually performed by the user or may be automatically performed. In a case where the second distance U4 is automatically changed, for example, it is possible to adopt a configuration in which the second restriction section 32 is displaced in the width direction by a rack and pinion mechanism (not shown) operated by a motor (not shown), and the control section 111 (refer to FIG. 1) controls the motor according to the medium size. For example, since the degree of skew of the medium received from the feeding device 5 tends to increase as the medium size in the transport direction decreases, it is desirable that the control section 111 (see FIG. 1) decreases the difference between the first distance U3 and the second distance U4 according to decrease in the medium size in the width direction.

Modification Example 5

The suction force of the medium by the transport belt 15 in the first region may be weaker than the suction force in the second region downstream of the first region in the transport direction.

Figure 10A:
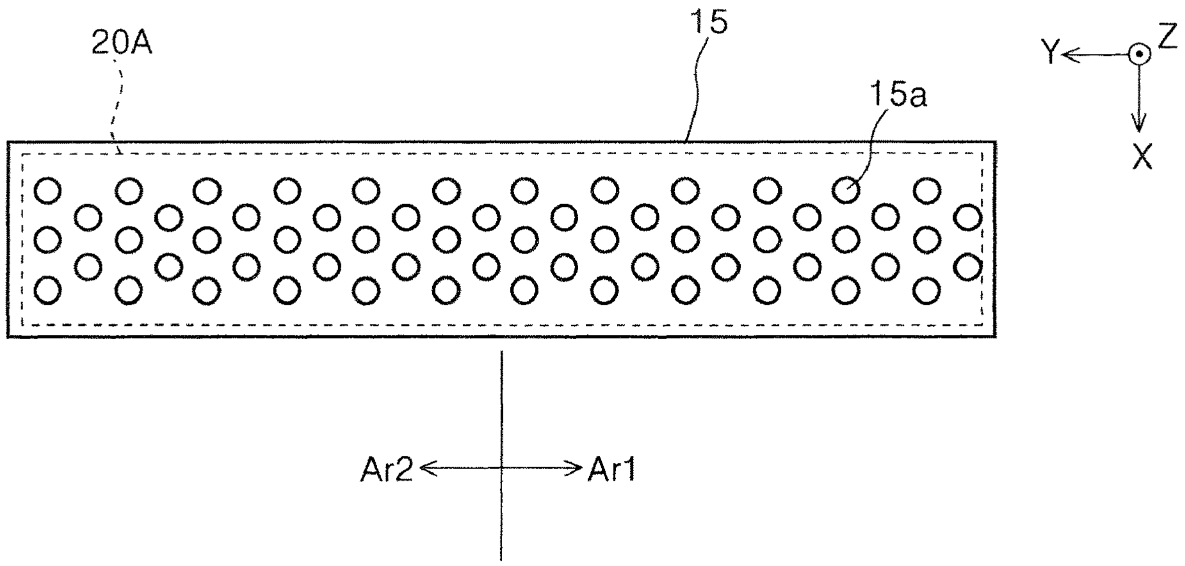
FIG. 10A is a plan view of the transport belt.
Figure 10B:
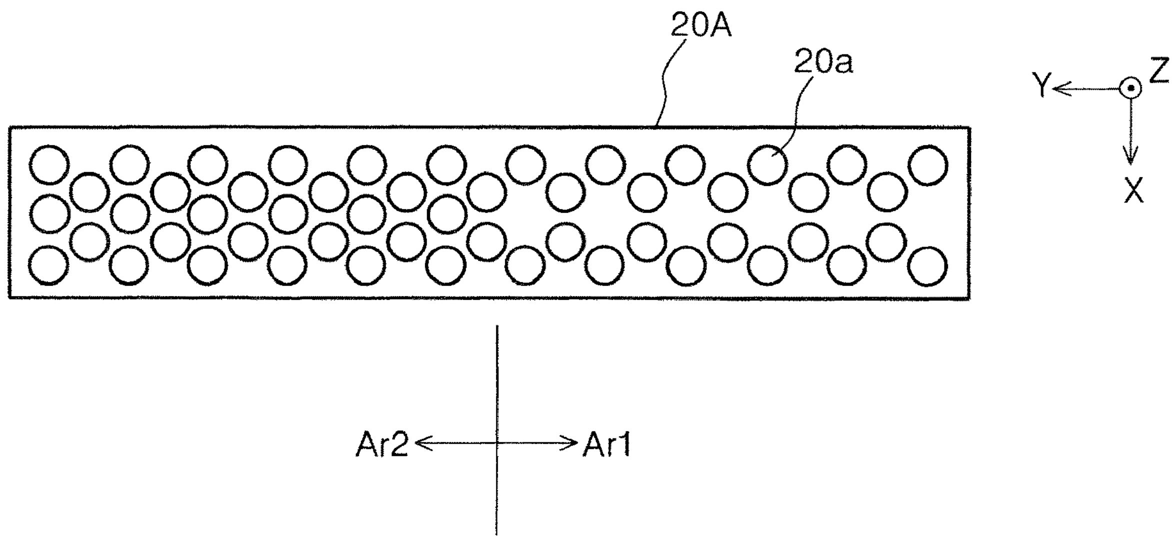
FIG. 10B is a plan view of a suction plate.

For example, the suction plate 20A shown in FIGS. 10A and 10B is a modified example of the above described suction plate 20, reference symbol Ar1 is a first region, and reference symbol Ar2 is a second region downstream of the first region Ar1. In the first region Ar1, the number of openings 20*a* is smaller than that in the second region Ar2, that is, the number of openings 20*a* overlapping with the through holes 15*a* of the transport belt 15 is smaller. As a result, the suction force in the first region Ar1 is weaker than that in the second region Ar2. Accordingly, in the first region Ar1 where the necessity of skew correction is high, the medium is more easily rotated than in the second region Ar2, and the skew correction can be appropriately performed. In addition, it is possible to reliably suck the medium in the second region Ar2 where it is desirable to reliably supply the medium to the recording device, and it is possible to appropriately supply the medium to the recording device 3.

The change of the suction force is not limited to the above described means, and any means may be used as long as the suction force per unit area of the transport belt 15 is made different between the first region Ar1 and the second region Ar2. For example, the suction blowers 18 may be provided for the first region Ar1 and the second region Ar2, and the suction forces may be made different from each other by adjusting the rotational speeds of the suction blowers 18. Further, the suction force may be varied by adjusting the size of the openings 20*a* (see FIGS. 5A and 5B) in the suction plate 20.

Modification Example 6

In the configuration in which the transport roller pair 25 for transporting the medium to the first transport belt 15A is provided upstream of the first transport belt 15A in the transport direction as in the present embodiment, the suction force of the medium by the first transport belt 15A, or the suction force of the medium by the first transport belt 15A and the suction force of the medium by the second transport belt 15B, may be changeable.

That is, in a case where the transport roller pair 25 is provided upstream of the first transport belt 15A in the transport direction, it is difficult for the medium to rotate while the medium is nipped by the transport roller pair 25, and there is a concern that damage such as wrinkling will occur in the medium due to the restraining action of the transport roller pair 25 and the rotating action of the first transport belt 15A being simultaneously applied to the medium. Depending on the length of the medium in the transport direction, the rotating action of the second transport belt 15B may be applied at the same time, which may cause the damage.

Therefore, by making it possible to change the suction force applied to the medium by the first transport belt 15A, or the suction force applied to the medium by the first transport belt 15A and the suction force applied to the medium by the second transport belt 15B, it is possible to weaken the suction force applied to the medium by the first transport belt 15A, or the suction force applied to the medium by the first transport belt 15A and the suction force applied to the medium by the second transport belt 15B, when there is a risk of damage as described above, and thus it is possible to suppress the damage described above.

The suction force can be adjusted by adjusting the rotational speed of the suction blower 18. The adjustment of the suction force may be performed by the user through an operation panel (not shown), or may be automatically performed under the control of the control section 111 (see FIG. 1) according to conditions such as the medium type and the medium size.

For example, since the damage as described above is more likely to occur the longer that the length of the medium is in the transport direction, it is desirable to make the suction force weaker according to the length of the medium in the transport direction, that is, as the length of the medium is longer. For example, when there is a first medium and a second medium whose length in the transport direction is longer than that of the first medium, a first suction force is used when the first medium is transported, and a second suction force weaker than the first suction force is used when the second medium is transported. Since such damage is more likely to occur as the rigidity of the medium is lower, when there is the first medium and the second medium having a rigidity lower than that of the first medium, the first suction force is used when the first medium is transported, and the second suction force weaker than the first suction force is used when the second medium is transported.

In this case, both the first transport belt 15A and the second transport belt 15B may be used as the second suction force, or only the first transport belt 15A may be used as the second suction force. Further, the second suction force may be applied only to the upstream section of the first transport belt 15A.

The suction force may be set to the second suction force until a trailing edge of the second medium in the transport direction passes through the transport roller pair 25, and the suction force may be set to the first suction force when the trailing edge of the second medium in the transport direction passes through the transport roller pair 25.

Modification Example 7

Regardless of the length of the medium, it is also desirable that the suction force of the medium by the first transport belt 15A be made weaker than the suction force of the medium by the second transport belt 15B. By this, the medium rotates more easily in the region of the first transport belt 15A where there is a high need for skew correction, than in the region of the second transport belt 15B, and skew correction can be performed appropriately. In the region of the second transport belt 15B where the medium is to be reliably delivered to the discharge roller pair 26, the medium is less likely to rotate than in the region of the first transport belt 15A, but the transport force is large, and the medium can be appropriately delivered to the discharge roller pair 26.

Modification Example 8

In a configuration in which the transport roller pair 25 that transports the medium to the first transport belt 15A is provided upstream in the transport direction with respect to the first transport belt 15A as in the present embodiment, the transport roller pair 25 may be configured to be switchable between the nip state in which the transport roller pair 25 nips the medium and the nip release state in which the transport roller pair 25 releases the nip, and in this case, the transport roller pair 25 may be switched to the nip release state after a part of the medium transported by the transport roller pair 25 in the nip state is sucked by the first transport belt 15A.

Figure 12A:
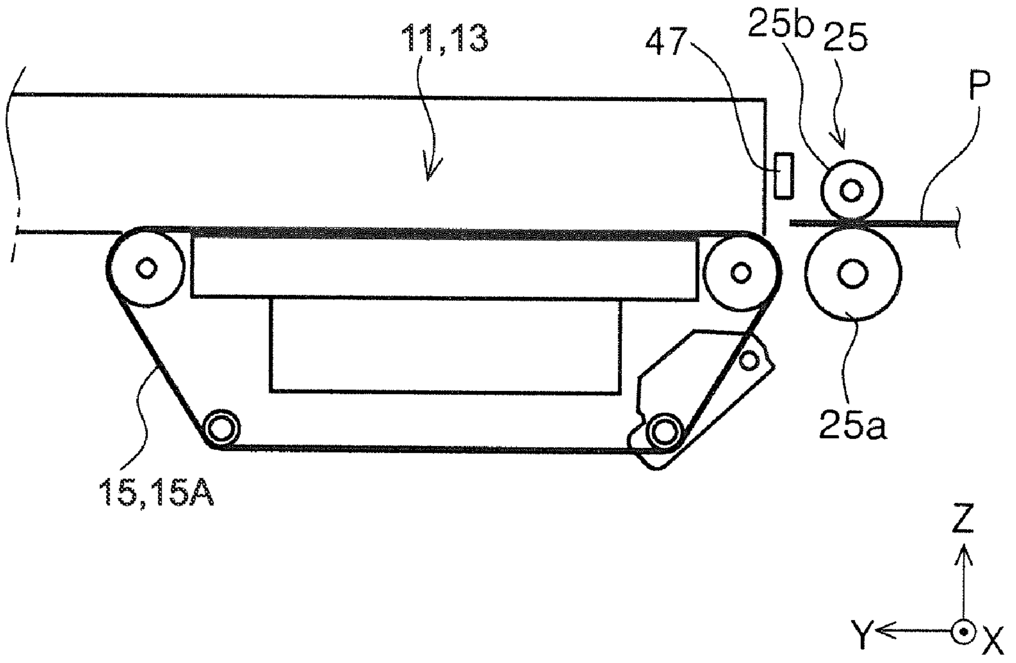
FIG. 12A is a side view of the transport roller pair and a first transport belt in the nipping state.
Figure 12B:
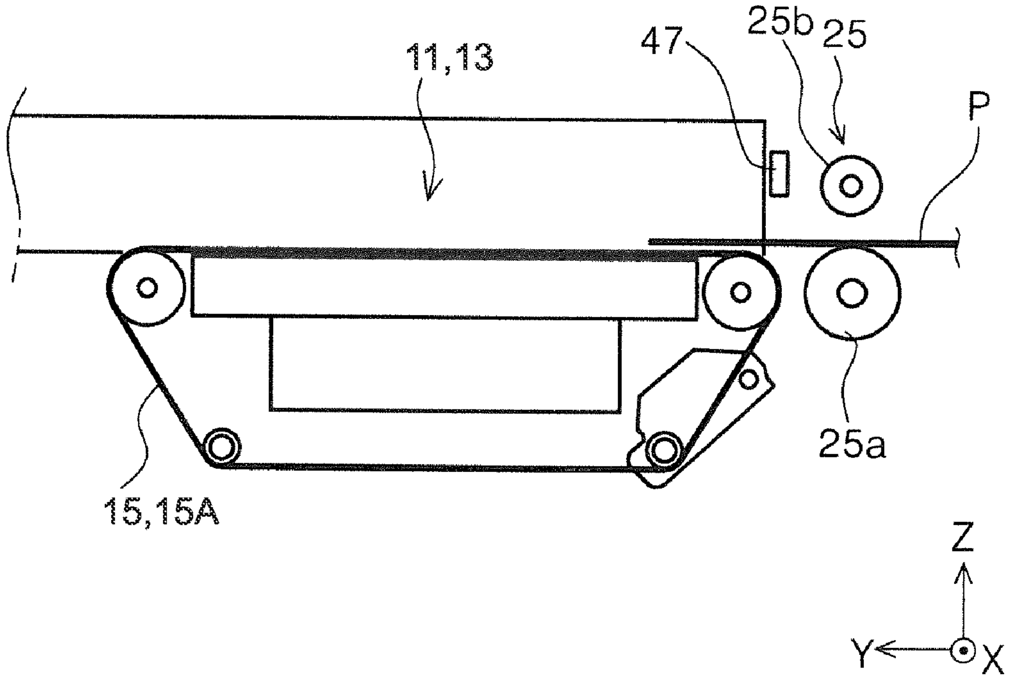
FIG. 12B is a side view of the transport roller pair and the first transport belt in the nip release state.

FIG. 12A shows the nip state of the transport roller pair 25, and FIG. 12B shows the nip release state of the transport roller pair 25.

After a part of the medium transported by the transport roller pair 25 in the nip state as shown in FIG. 12A is sucked by the first transport belt 15A as shown FIG. 12B, the transport roller pair 25 is switched to the nip release state. In FIGS. 12A and 12B, reference symbol P denotes medium. As a result, the following effects can be obtained.

That is, it is difficult for the medium to rotate while the medium is nipped by the transport roller pair 25, and there is a concern that damage such as wrinkling will occur in the medium due to the restraining action of the transport roller pair 25 and the rotating action of the first transport belt 15A being simultaneously applied to the medium.

However, since the transport roller pair 25 is switched to the nip release state after a part of the medium transported by the transport roller pair 25 in the nip state is sucked to the first transport belt 15A, it is possible to shorten a period in which the restraining action by the transport roller pair 25 and the rotating action by the first transport belt 15A are simultaneously applied to the medium, and it is possible to suppress the damage as described above.

Figure 11A:
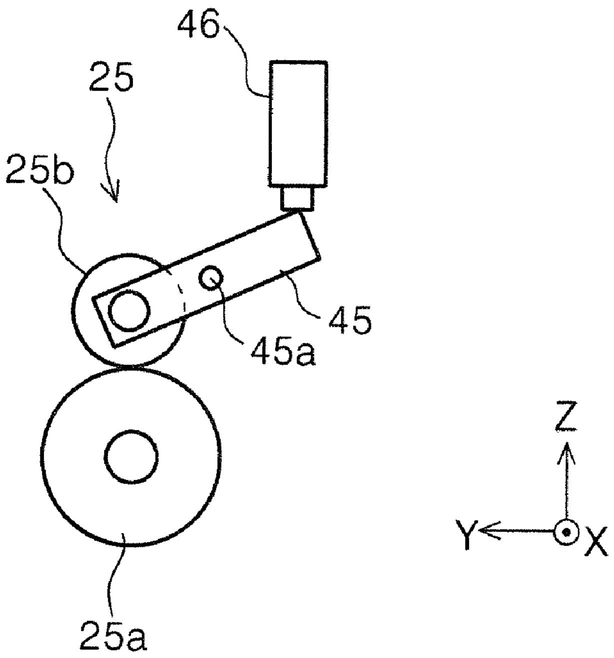
FIG. 11A is a side view of a transport roller pair in a nip state.
Figure 11B:
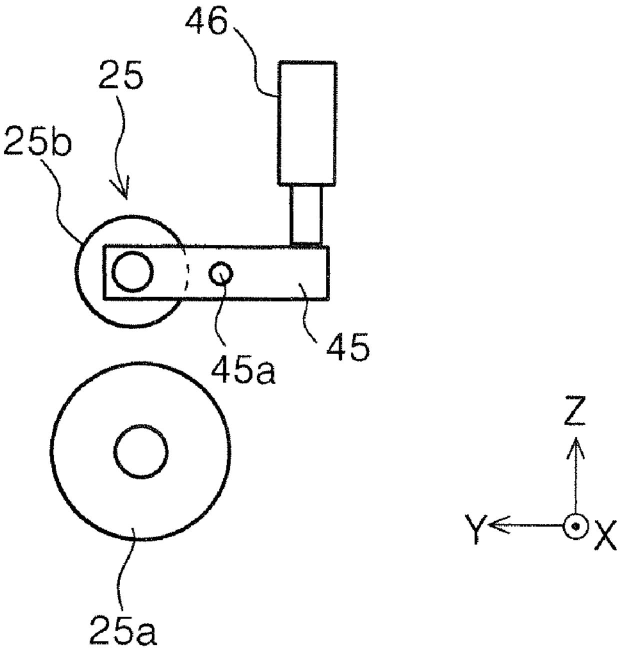
FIG. 11B is a side view of the transport roller pair in the nip release state.

As shown in FIGS. 11A and 11B, it is provided so as to be vertically displaceable by a solenoid 46 as an example, and the transport roller pair 25 can be configured to switch between the nip state and the nip release state by vertically displacing the driven roller 25*b*. More specifically, in FIGS. 11A and 11B, the driven roller 25*b* is supported by a support member 45 rotatable about a rotation shaft 45*a*, and the driven roller 25*b* advances toward and retreats from the drive roller 25*a* by rotation of the support member 45. The support member 45 is pressed in the counterclockwise direction of FIGS. 11A and 11B, that is, in the direction in which the driven roller 25*b* advances to the drive roller 25*a*, by a pressing member (not shown), for example, a spring.

The solenoid 46 can be engaged with the support member 45, and in the nip state of the transport roller pair 25 shown in FIG. 11A, by pressing the −Y direction end section of the support member 45 downward, the support member 45 is rotated as shown by the change from FIG. 11A to FIG. 11B, and the transport roller pair 25 is switched to the nip release state.

The solenoid 46 is controlled by the control section 111 (see FIG. 1). A medium detection section 47 is provided between the transport roller pair 25 and the first transport belt 15A in the medium transport path, as shown in FIGS. 12A and 12B, and the control section 111 switches the transport roller pair 25 from the nip state to the nip release state based on the detection information of the medium detection section 47.

The timing of switching the transport roller pair 25 from the nip state to the nip release state may be changed according to type of the medium. For example, since in a case where the rigidity of the medium is high, the above described damage is less likely to occur than in a case where the rigidity is relatively low, in the case of the medium having high rigidity, the timing of switching the transport roller pair 25 from the nip state to the nip release state may be delayed. As a result, the medium can be reliably transported downstream by the transport roller pair 25.

After a part of the medium transported by the transport roller pair 25 in the nip state is sucked to the first transport belt 15A, it is desirable that the restraint of the medium by the feed roller 63 of the feeding device 5 is released when the transport roller pair 25 is switched to the nip release state. This is because when the medium is restrained by the feed roller 63 of the feeding device 5, the medium is difficult to rotate, and there is a concern that damage such as wrinkles described above may occur.

Here, the state in which "the restraint of the medium by the feed roller 63 is released" means a state, such as a state in which the feed roller 63 is not in contact with the medium, in which the above described damage is unlikely to occur in the medium due to force received from the feed roller 63 when the medium is about to rotate due to the action of the first transport belt 15A. Therefore, in a case where the feed roller 63 can be switched between a state of being in contact with the medium stacked on the stacking section 60 and a state of being separated from the medium stacked on the stacking section 60, it is desirable to separate the feed roller 63 from the medium when the leading edge of the medium is nipped by the transport roller pair 25.

Modification Example 9

Figure 13:
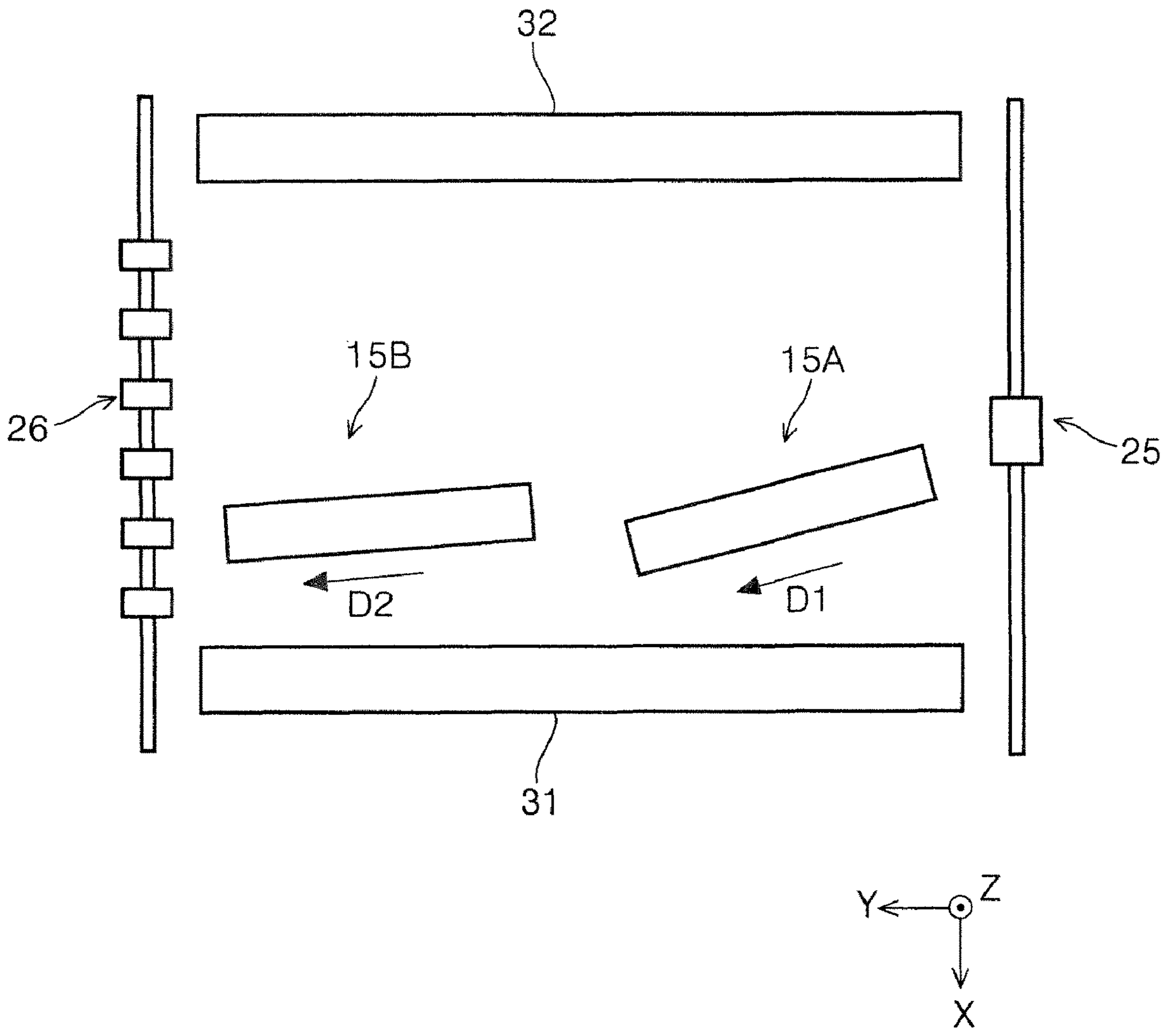
FIG. 13 is a plan view of a configuration in which an angle formed by a second direction and the transport direction is smaller than an angle formed by a first direction and the transport direction.

Regarding the first direction D1 by the first transport belt 15A and the second direction D2 by the second transport belt 15B, as shown in FIG. 13, the +Y direction, that is, the angle formed by the transport direction and the second direction D2 may be smaller than the angle formed by the transport direction and the first direction D1.

As a result, in the region of the first transport belt 15A where the need for skew correction is high, the effect of skew correction is higher than that in the region of the second transport belt 15B, and skew correction can be performed appropriately. In the region of the second transport belt 15B where the medium is to be reliably delivered to the discharge roller pair 26, the medium is transported at an angle closer to the transport direction than in the region of the first transport belt 15A, and the medium can be appropriately delivered to the discharge roller pair 26.

In a case where the first direction D1 and the second direction D2 are different, it is desirable to adjust the circulation speed of the first transport belt 15A and the circulation speed of the second transport belt 15B such that the transport speed in the +Y direction by the first transport belt 15A and the transport speed in the +Y direction by the second transport belt 15B are the same.

Modification Example 10

Figure 14:
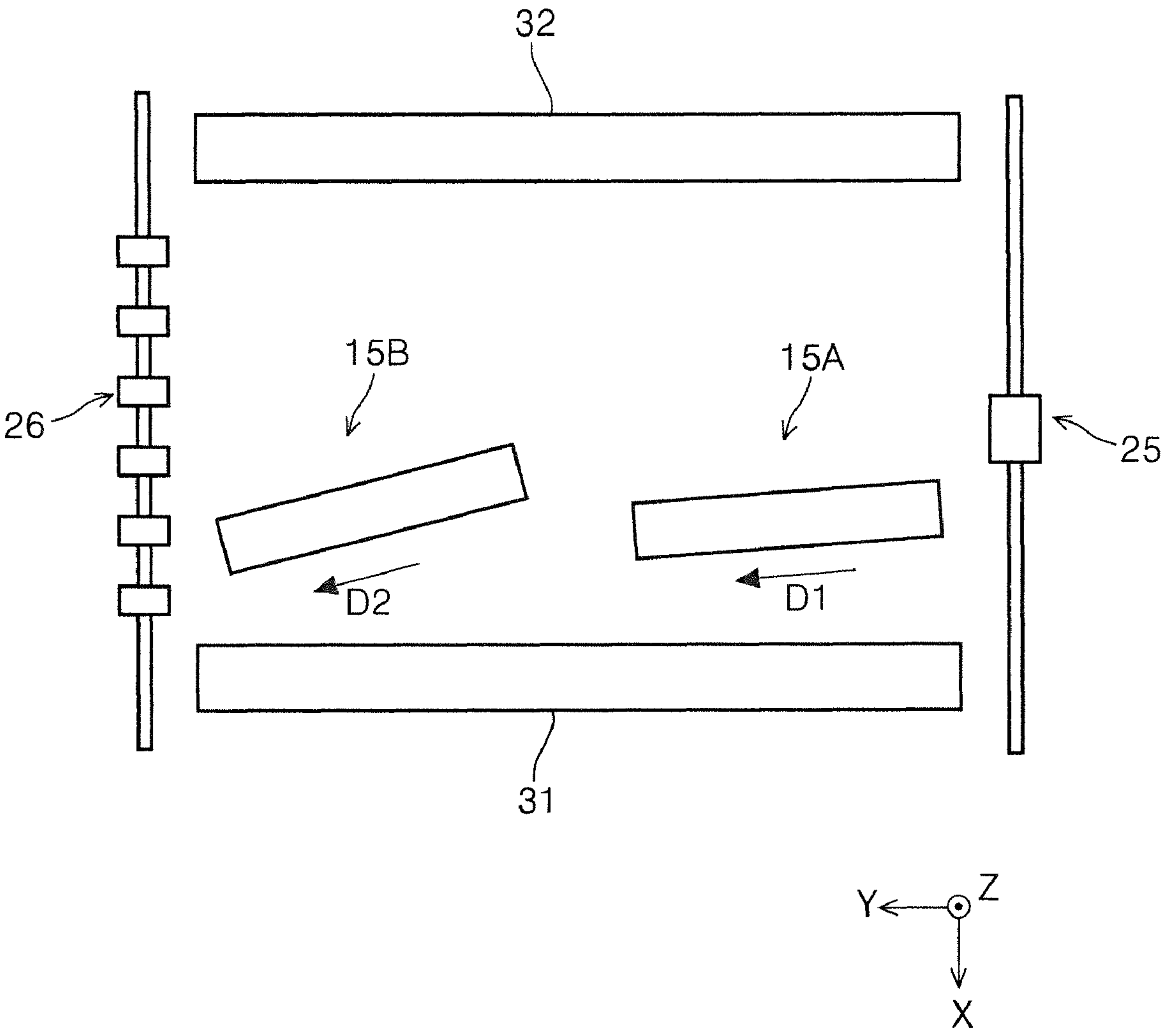
FIG. 14 is a plan view of a configuration in which the angle formed by the first direction and the transport direction is smaller than the angle formed by the second direction and the transport direction.

In the configuration in which the transport roller pair 25 for transporting the medium to the first transport belt 15A is provided upstream of the first transport belt 15A in the transport direction as in the present embodiment, the angle formed by the transport direction and the first direction D1 may be smaller than the angle formed by the transport direction and the second direction D2 as shown in FIG. 14.

As described above, in a case where the transport roller pair 25 is provided upstream of the first transport belt 15A in the transport direction, it is difficult for the medium to rotate while the medium is nipped by the transport roller pair 25, and there is a concern that damage such as wrinkling will occur in the medium due to the restraining action of the transport roller pair 25 and the rotating action of the first transport belt 15A being simultaneously applied to the medium.

However, as shown in FIG. 14, by making the angle formed by the transport direction and the first direction D1 smaller than the angle formed by the transport direction and the second direction D2, the rotating action applied to the medium by the first transport belt 15A is suppressed, and the occurrence of damage can be suppressed.

In such a configuration, the angle between the transport direction and the first direction D1 and the angle between the transport direction and the second direction D2 may be adjusted in accordance with the lengths of the medium in the transport direction. For example, the longer the medium is in the transport direction, the longer the time during which the restraining action of the transport roller pair 25 and the rotating action of the first transport belt 15A will be simultaneously applied, and the higher the risk of damage, so the smaller the angle may be set between the transport direction and the first direction D1, with increase in length of the medium in the transport direction.

In a case where the first direction D1 and the second direction D2 are different, it is desirable to adjust the circulation speed of the first transport belt 15A and the circulation speed of the second transport belt 15B such that the transport speed in the +Y direction by the first transport belt 15A and the transport speed in the +Y direction by the second transport belt 15B are the same.

Modification Example 11

Figure 15:
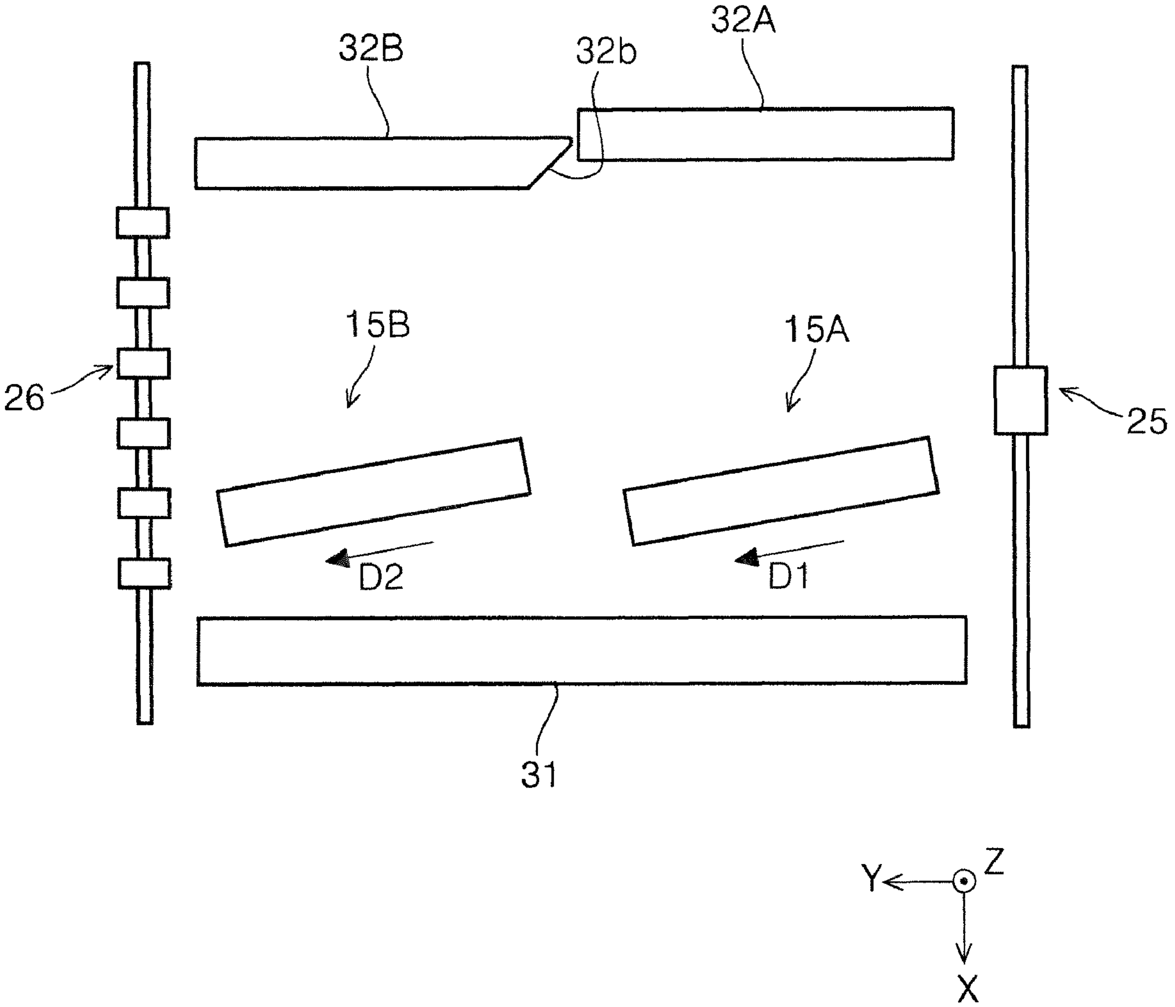
FIG. 15 is a plan view of a configuration in which a second restriction section includes an upstream second restriction section and a downstream second restriction section.

As shown in FIG. 15, the second restriction section 32 may be constituted by an upstream second restriction section 32A provided for the first transport belt 15A and a downstream second restriction section 32B provided for the second transport belt 15B. The upstream second restriction section 32A and the downstream second restriction section 32B may be configured to be independently displaceable in the width direction. With such a configuration, it is possible to appropriately restrict the second edge Ps2 of the medium according to the first direction D1 and the second direction D2.

In this case, as shown in FIG. 15, the downstream second restriction section 32B may be closer to the first restriction section 31 than the upstream second restriction section 32A. Thus, the position in the width direction of the medium of which the skew is corrected can be appropriately regulated. In this case, it is also desirable to form an inclined guide surface 32*b* for suppressing the medium from being caught upstream of the downstream second restriction section 32B.

Modification Example 12

Figure 16:
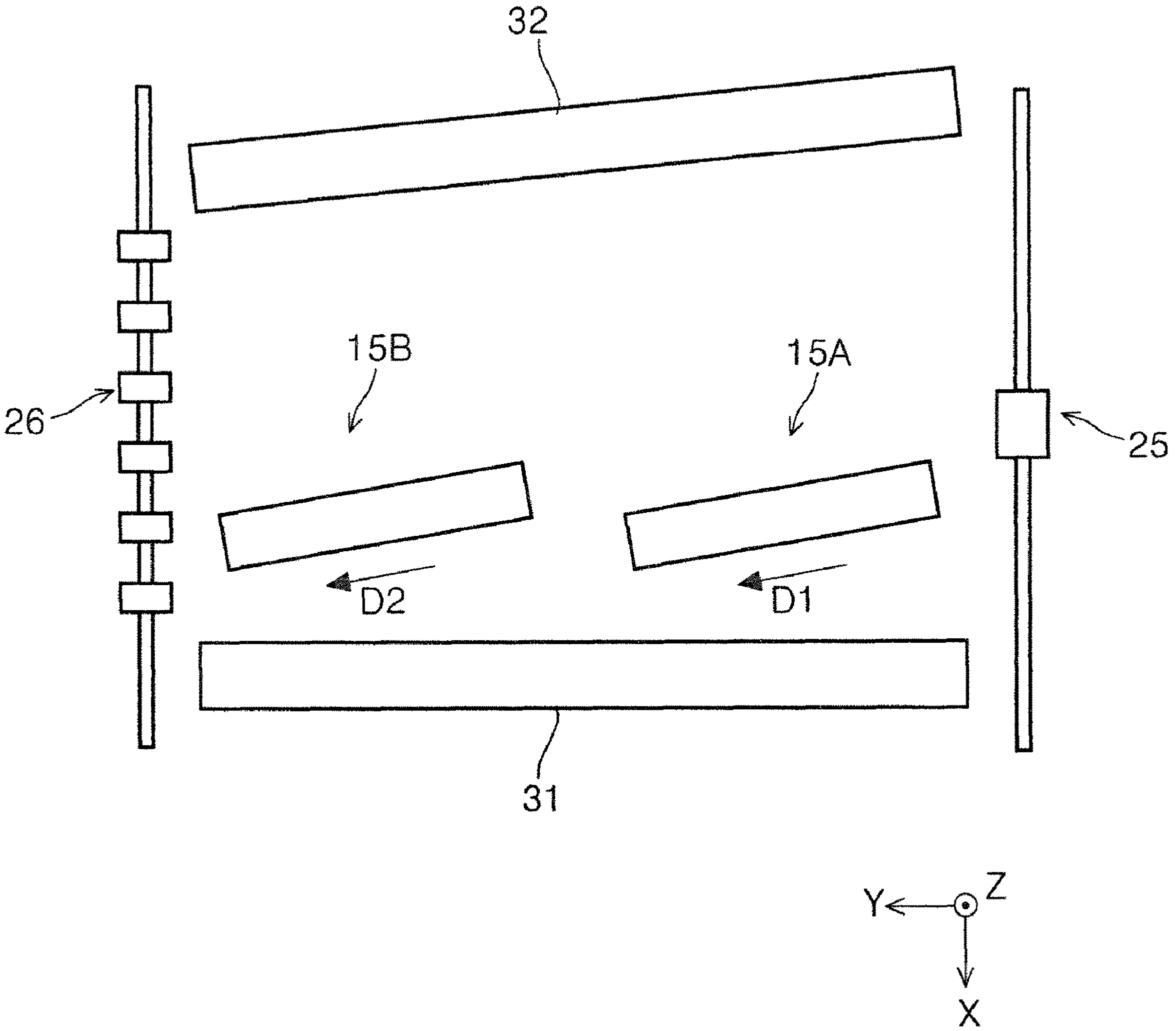
FIG. 16 is a plan view of a configuration in which the second restriction section approaches the first restriction section with progression the downstream in the transport direction.

As shown in FIG. 16, the second restriction section 32 may be provided so as to approach the first restriction section 31 downstream in the transport direction. Thus, the position in the width direction of the medium of which the skew is corrected can be appropriately regulated.

In such a configuration, the second restriction section 32 may be constituted by the plurality of restriction sections along the transport direction as shown in FIG. 15.

Modification Example 13

Figure 17:
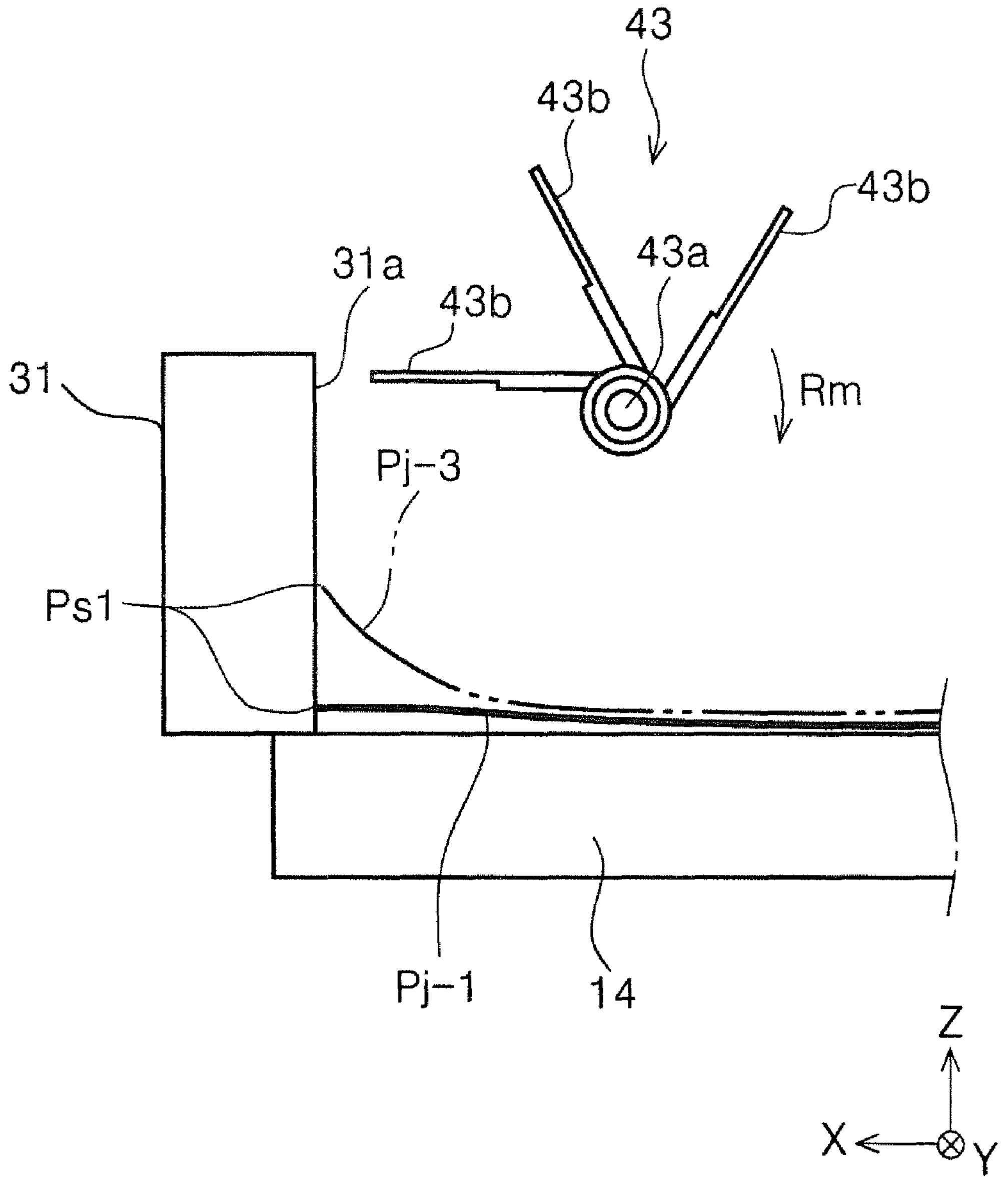
FIG. 17 is a view of the upper restriction section constituted by a paddle as viewed from the transport direction.

In addition to the inclination of the transport belt with respect to the transport direction, as shown in FIG. 17, the movement of the medium toward the first restriction section 31 may be performed by a paddle 43 that moves the medium toward the first restriction section 31 by rotating. In FIG. 17, the paddle 43 is provided so as to be rotatable about a rotation shaft 43*a*. The rotation shaft 43*a* is rotated in the direction of an arrow Rm by power of a motor (not shown) controlled by the control section 111 (see FIG. 1). Similarly to the upper restriction members 39 shown in FIG. 7, a plurality of paddles 43 are provided along the transport direction. The paddle 43 has a plurality of blade sections 43*b* formed of an elastically deformable material (for example, rubber) along the circumferential direction of the rotation shaft 43*a*. The blade sections 43*b* are positioned at a position farthest from the rotary table 14 as indicated by solid line before receiving the medium into the relay transport device 4, and when the medium is supplied to the relay transport device 4, the blade sections 43*b* rotate in the direction of the arrow Rm to move the medium toward the first restriction section 31.

Since the medium is moved to the first restriction section 31 as indicated by reference symbol Pj-1 by the paddles 43, it is possible to appropriately correct the skew of the medium.

The paddles 43 shown in FIG. 17 are disposed so that the rotation shaft 43*a* extends in the Y-axis direction and the medium is moved in the +X direction, but may be disposed so that the medium is moved in the intersecting direction D.

In a case where the side end portion including the first edge Ps1 is easily deformed or curled upward as indicated by reference symbol Pj-3 by the action of the paddles 43 when the first edge Ps1 of the medium comes into contact with the first restriction surface 31*a* of the first restriction section 31, it is also desirable to use the upper restriction section 38 described with reference to FIG. 7 together with the paddles 43.

Modification Example 14

At least one of the suction force of the first transport belt 15A against the medium and the suction force of the second transport belt 15B against the medium may be changed in accordance with the length of the medium in the width direction (X-axis direction).

Figure 18A:
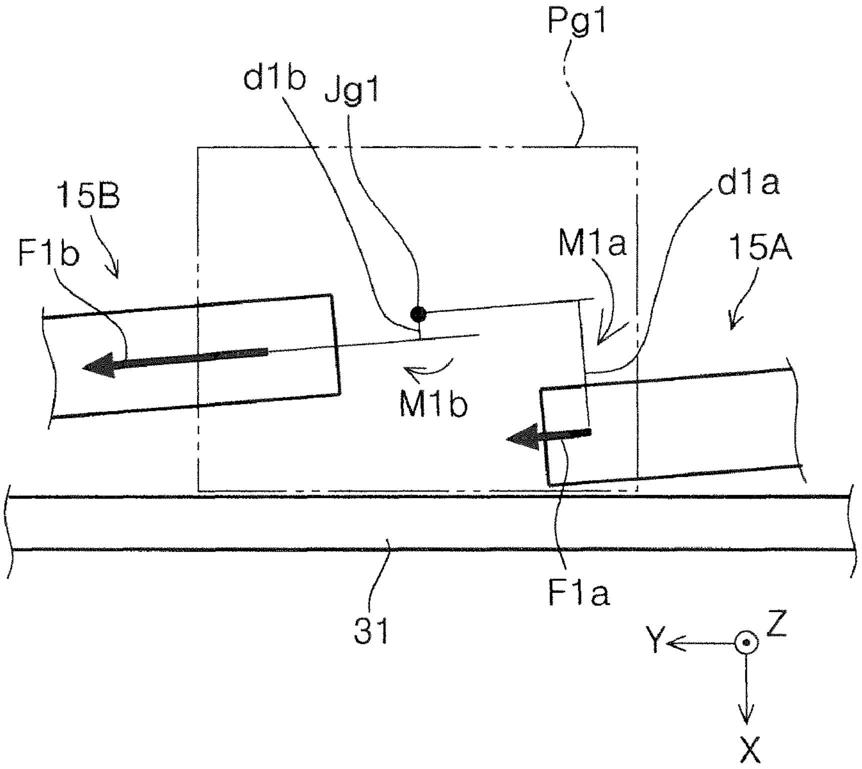
FIG. 18A is a diagram showing a moment when the first medium is transported.
Figure 18B:
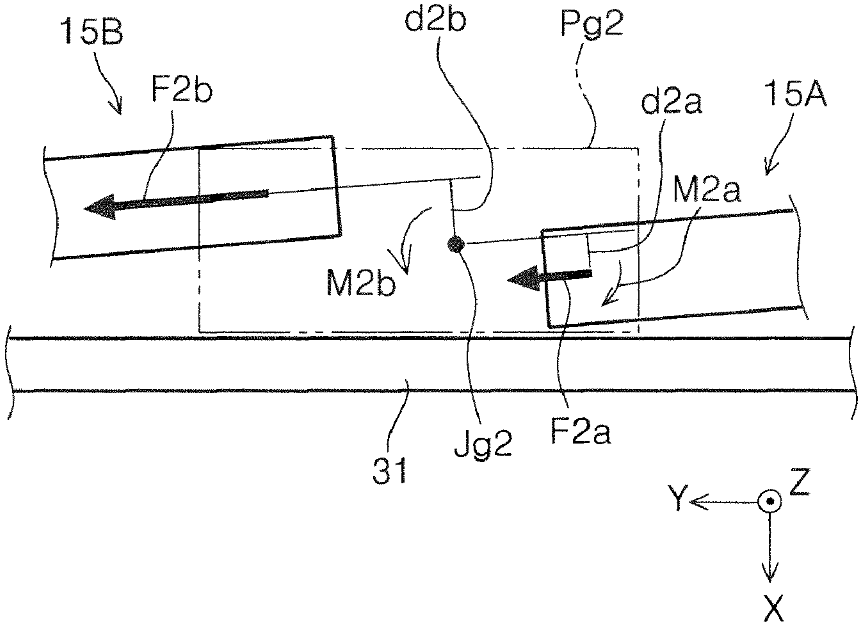
FIG. 18B is a diagram showing a moment when a second medium shorter than the first medium in the widthwise direction is transported.

Referring to FIGS. 18A and 18B, the moment generated in the medium when the medium is delivered from the first transport belt 15A to the second transport belt 15B will be described. FIG. 18A is a diagram showing a case where a first medium Pg1 is transported, and FIG. 18B is a diagram showing a case where a second medium Pg2 whose length in the width direction is shorter than that of the first medium Pg1 is transported.

In a case where the medium overlaps with both the first transport belt 15A and the second transport belt 15B, a first moment around the center of gravity is generated in the medium by the transport force received from the first transport belt 15A, and a second moment around the center of gravity is generated in the medium by the transport force received from the second transport belt 15B.

In FIG. 18A, reference symbol Jg1 denotes the centroid position of the first medium Pg1. Note that the centroid position of the medium in the Y-axis direction does not always coincide with the center position of the medium in the Y-axis direction. Similarly, the centroid position of the medium in the X-axis direction does not always coincide with the center position of the medium in the X-axis direction. An example of such a medium is an envelope.

The first medium Pg1 receives the transport force Fla from the range overlap with the suction area of the first transport belt 15A, and receives the transport force F1*b* from the range overlap with the suction area of the second transport belt 15B. It is assumed that the transport force Fla acts on a center position of a range in which the first medium Pg1 overlaps the suction area of the first transport belt 15A, and the transport force F1*b* acts on a center position of a range in which the first medium Pg1 overlaps the suction area of the second transport belt 15B.

The transport force Fla is parallel to the first direction D1, and a line segment d1*a* indicates a distance between an acting position of the transport force Fla and the centroid position Jg1 in a direction orthogonal to the first direction D1.

The transport force F1*b* is parallel to the second direction D2, and a line segment dlb indicates a distance between an acting position of the transport force F1*b* and the centric position Jg1 in a direction orthogonal to the second direction D2.

The first moment M1*a* around the centroid position Jg1 acts on the first medium Pg1 due to the transport force Fla, and the second moment M1*b* around the centroid position Jg1 acts on the first medium Pg1 due to the transport force F1*b*.

Since the first moment M1*a* and the second moment M1*b* are in the same direction, which is the same as the skew correction direction (the clockwise direction in the drawing), the skew of the first medium Pg1 is appropriately corrected.

Next, in FIG. 18B, reference symbol Jg2 denotes the centroid position of the second medium Pg2. The second medium Pg2 receives the transport force F2*a* from the range overlap with the suction area of the first transport belt 15A, and receives the transport force F2*b* from the range overlap with the suction area of the second transport belt 15B. It is assumed that the transport force F2*a* acts on a center position of a range in which the second medium Pg2 overlaps the suction area of the first transport belt 15A, and the transport force F2*b* acts on a center position of a range in which the second medium Pg2 overlaps the suction area of the second transport belt 15B.

The transport force F2*a* is parallel to the first direction D1, and a line segment d2*a* indicates a distance between an acting position of the transport force F2*a* and the centroid position Jg2 in a direction orthogonal to the first direction D1.

The transport force F2*b* is parallel to the second direction D2, and a line segment d2*b* indicates a distance between the action position of the transport force F2*b* and the centroid position Jg2 in a direction orthogonal to the second direction D2.

The first moment M2*a* around the centroid position Jg2 acts on the second medium Pg2 due to the transport force F2*a*, and the second moment M2*b* around the centroid position Jg2 acts on the second medium Pg2 due to the transport force F2*b*.

The direction of the first moment M2*a* and the direction of the second moment M2*b* are opposite to each other, the first moment M2*a* is larger than the second moment M2*b*, and the direction of the first moment M2*a* is opposite to the skew correction direction (the clockwise direction in the drawing), which is a direction in which the skew deteriorates, and the skew of the second medium Pg2 cannot be appropriately corrected.

In this manner, since the centroid position of the medium changes according to the length of the medium in the width direction, and thus the direction of the first moment and the direction of the second moment are determined, the length of the medium in the width direction is important from the viewpoint of appropriately correcting the skew of the medium.

In the present embodiment, based on such a property, the suction force of the first transport belt 15A against the medium, the suction force of the second transport belt 15B against the medium, or the suction force of the first transport belt 15A against the medium and the suction force of the second transport belt 15B against the medium are changed according to the length of the medium in the width direction. Accordingly, it is possible to adjust the direction of the first moment and the direction of the second moment such that the skew of the medium is appropriately corrected, and thus it is possible to appropriately correct the skew of the medium.

As an example, the control section 111 can adjust the suction force of the first transport belt 15A against the medium by controlling the suction blower 18 included in the first transport section 11, and can adjust the suction force of the second transport belt 15B against the medium by controlling the suction blower 18 included in the second transport section 12.

The second medium Pg2 is an example of a medium whose length in the width direction is shorter than a predetermined length, and the control section 111, as an example, controls the suction blower 18 provided in the first transport section 11 to make the suction force of the first transport belt 15A against the medium larger than a predetermined value at least when the second medium Pg2 is delivered from the first transport belt 15A to the second transport belt 15B. Accordingly, it is possible to increase the first moment M2*a*, that is, the moment in the same direction as the skew correction direction (clockwise direction in the drawing), and it is possible to appropriately correct the skew of the second medium Pg2.

The adjustment of the suction force for adjusting the relationship between the first moment and the second moment so that the skew correction direction becomes more appropriate includes a case where only the suction force of the first transport belt 15A against the medium is changed, a case where only the suction force of the second transport belt 15B against the medium is changed, or a case where both the suction force of the first transport belt 15A against the medium and the suction force of the second transport belt 15B against the medium are changed.

For example, in a case where only the suction force of the second transport belt 15B against the medium is changed, when the transport force F2*b* is decreased in FIG. 18B, the second moment M2*b* can be decreased, and further, the influence of the first moment M2*a* in the same direction as the skew correction direction (the clockwise direction in the drawing) can be increased to appropriately correct the skew.

Information on the relationship between the suction force of the first transport belt 15A against the medium and the suction force of the second transport belt 15B against the medium according to the width direction length of the medium can be stored in a nonvolatile memory (not shown) included in the control section 111 or in an external information device (not shown) capable of communicating with the control section 111.

Note that the suction force may be changed not in the entire first transport belt 15A but in a part thereof, and similarly, the suction force may be changed not in the entire second transport belt 15B but in a part thereof. The partial change of the suction force, as an example, can be performed in the same manner as described with reference to FIGS. 10A and B. In this case, by making the suction force of the downstream region of the first transport belt 15A in the transport direction larger than the suction force of the upstream region of the second transport belt 15B in the transport direction, it is possible to increase the first moment M2*a*, that is, the moment in the same direction as the skew correction direction (clockwise direction in the drawing), and it is possible to appropriately correct the skew of the second medium Pg2.

The relationship between the suction force of the first transport belt 15A against the medium and the suction force of the second transport belt 15B against the medium as described above may be set in the entire period of transporting the medium, or may be set only when the medium is delivered from the first transport belt 15A to the second transport belt 15B.

Hereinafter, modification examples will be schematically described.

A medium supplying system according to a first aspect is a medium supplying system that feeds a medium to a recording device that performs recording on the medium includes a feeding device that is disposed outside the recording device and that is configured to feed the medium to the recording device and a relay transport device that is disposed between the recording device and the feeding device on the outside of the recording device and that is configured to relay and transport the medium fed from the feeding device to the recording device, wherein the feeding device includes a stacking section configured to stack the medium and a feeding section configured to feed the medium, the relay transport device includes a first restriction section having a first restriction surface configured to position a first edge of the medium fed from the feeding device and a transport section configured to transport the medium toward the first restriction section in an intersecting direction which intersects the transport direction and the width direction, and assuming that a center position of the medium in the width direction in a state where the first edge is along the first restriction section is set as a first center position and that a center position of the medium in the width direction in a state where the medium is stacked on the stacking section is set as second center position, a distance between the second center position and the first restriction surface is longer than the first center position and the first restriction surface, in the width direction.

According to the present aspect, even when the medium fed from the feeding device is skewed, the skew is corrected by the first edge of the medium contacting the first restriction surface in the relay transport device.

Further, the position of the medium in the width direction is less likely to vary compared with a configuration in which the skew is corrected by bringing the leading edge of the medium into contact with the roller pair. Thus, appropriate recording can be performed in the recording device.

Since the relay transport device and the feeding device are disposed such that the distance between the second center position and the first restriction surface is longer than the distance between the first center position and the first restriction surface in the width direction, it is possible to suppress the medium from being caught on the first restriction section when the medium is supplied from the feeding device to the relay transport device.

A second aspect is an aspect according to the first aspect, wherein the feeding section is configured to feed the medium by contact with the second center position of the medium in the width direction.

According to the present aspect, since the feeding section is configured to feed the medium by contact with the second center position of the medium in the width direction, it is possible to suppress skewing of the medium which is fed out from the feeding device.

A third aspect is an aspect according to the first aspect, wherein the feeding device includes a first feeding guide having a first feeding guide surface configured to position the first edge of the medium, and the first feeding guide surface is positioned between the first restriction surface and the first center position in the width direction.

According to the present aspect, since the feeding device includes the first feeding guide surface configured to position the first edge of the medium, it is possible to prevent the position of the first edge of the medium, which is fed from the feeding device, from being close to the first restriction surface, and it is possible to prevent the medium from being caught on the first restriction section when the medium is supplied from the feeding device to the relay transport device.

The distance between the first restriction surface and the first feeding guide in the width direction does not become longer than necessary, and the medium can appropriately contact against the first restriction section after being supplied from the feeding device to the relay transport device, and thus the skew of the medium can be appropriately corrected.

This aspect is not limited to the first aspect, and may be applied to the second aspect.

A fourth aspect is an aspect according to the third aspect, wherein the feeding device includes a second feeding guide having a second feeding guide surface configured to restrict a position of a second edge on an opposite side from the first edge of the medium and the second center position is at an intermediate position between the first feeding guide surface and the second feeding guide surface in the width direction.

According to the present aspect, since the feeding device further includes the second feeding guide configured to restrict the position of the second edge on the opposite side from the first edge of the medium, it is possible to suppress skewing of the medium which is fed out from the feeding device. Since the second center position is at an intermediate position between the first feeding guide surface and the second feeding guide surface in the width direction, it is possible to more favorably suppress skewing of the medium which is fed out from the feeding device.

A fifth aspect is an aspect according to the first aspect, wherein the transport section includes a transport belt configured to transport the medium and a suction section configured to suck the medium via a through hole provided in the transport belt.

According to the present aspect, the transport section includes the transport belt configured to transport the medium and the suction section configured to suck the medium via the through hole provided in the transport belt, the medium is easily rotated compared to a configuration in which the medium is nipped by the roller pair, and it is possible to appropriately correct the skew of the medium.

This aspect is not limited to the first aspect, and may be applied to any of the second to fourth aspects.

A sixth aspect is an aspect according to the first aspect, wherein the relay transport device includes a second restriction section having a second restriction surface configured to restrict a position of a second edge, which is an opposite side from the first edge of the medium.

The medium is moved to the side of the first restriction section by the transport belt. However, as an example, when the medium rotates so that the downstream end of the first edge is separated from the first restriction surface, there is a concern that the correction of the skew cannot be performed even when the medium is transported by a distance which can be transported by the transport belt. Note that this is merely an example, and there are cases where the medium may move a direction away from the first restriction surface without being rotated as described above. However, according to the present aspect, since the second restriction section configured to restrict the position of the second edge of the medium on the opposite side from the first edge of the medium is provided, it is possible to suppress the occurrence of the defects described above.

This aspect is not limited to the first aspect, and may be applied to any of the second to fifth aspects.

A seventh aspect is an aspect according to the sixth aspect, wherein a center position of the medium in the width direction in a state where the first edge is along the first restriction surface is set as a first center position, and a second distance which is a distance between the first center position and the second restriction surface in the width direction is longer than a first distance which is a distance between the first center position and the first restriction surface.

According to the present aspect, since the second distance is longer than the first distance, it is possible to appropriately receive the skewed medium from the feeding device.

A eighth aspect is an aspect according to the fifth aspect, further includes a transport roller pair provided upstream in the transport direction with respect to the transport belt and configured to transport the medium to the transport belt, wherein the transport roller pair is switchable between a nip state in which the transport roller pair nips the medium and a nip release state in which the transport roller pair releases the nip, the transport roller pair is switched to the nip release state after a part of the medium transported by the transport roller pair in the nip state is sucked by the transport belt and in a state in which restraint of the medium by the feeding section is released.

In a case where the transport roller pair is provided upstream of the transport belt in the transport direction, it is difficult for the medium to rotate while the medium is nipped by the transport roller pair and is restrained by the feeding section, and there is a concern that damage such as wrinkling will occur in the medium due to the restraining action of the transport roller pair and the feeding section and the rotating action of the transport belt being simultaneously applied to the medium.

According to the present aspect, since after a part of the medium transported by the transport roller pair in the nip state is sucked to the transport belt and in a state in which restraint of the medium by the feeding section is released the transport roller pair switches to the nip release state, it is possible to shorten a period in which the restraining action by the transport roller pair and the feeding unit and the rotating action by the transport belt are simultaneously applied to the medium and to suppress the damage.

Here, "the state in which the restraint of the medium by the feeding section is released" means a state in which the medium is less likely to be damaged by the force received from the feeding section when the medium is about to rotate due to the action of the transport belt, such as a state in which the feeding section is not in contact with the medium.

The recording system according to a ninth aspect includes the recording device configured to record on the medium and the medium supplying system according to any one of the first to eighth aspects that disposed outside the recording device and configured to supply the medium to the recording device.

According to the present aspect, in the recording system, the operational effects of any one of the first to eighth aspects can be obtained.

The present disclosure is not limited to the embodiments described above, and various modifications can be made within the scope of the disclosure described in the claims, and it is needless to say that these are also included in the scope of the present disclosure.

What is claimed is:

1. A relay transport device that is positioned between a recording device, which performs recording on a medium, and a feeding device, which is disposed outside the recording device and which feeds the medium to the recording device, and that is configured to relay the medium fed from the feeding device and to transport the medium to the recording device, the relay transport device comprising:

a first restriction section having a first restriction surface configured to position a first edge of the medium fed from the feeding device, the first edge being an edge in a width direction intersecting a transport direction;

a second restriction section having a second restriction surface configured to restrict a position of a second edge, which is an opposite side from the first edge of the medium;

a first transport belt configured to transport the medium toward the first restriction surface in a first direction, which intersects the transport direction and the width direction;

a second transport belt that is provided downstream of the first transport belt in the transport direction and that is configured to transport the medium toward the first restriction surface in a second direction, which intersects the transport direction and the width direction; and a suction section configured to suck the medium via a through hole provided in the first transport belt and the second transport belt, wherein, the second restriction section has an upstream second restriction section provided with respect to the first transport belt and a downstream second restriction section provided with respect to the second transport belt, and the upstream second restriction section and the downstream second restriction section are configured to independently displace in the width direction.

2. The relay transport device according to claim 1, wherein the second direction is a direction along the first direction.

3. The relay transport device according to claim 1, wherein the first direction and the second direction are changeable.

4. The relay transport device according to claim 1, wherein an angle formed by the transport direction and the second direction is smaller than an angle formed by the transport direction and the first direction.

5. The relay transport device according to claim 1, further comprising:

a transport roller pair provided upstream in the transport direction with respect to the first transport belt and configured to transport the medium to the first transport belt, wherein an angle formed by the transport direction and the first direction is smaller than an angle formed by the transport direction and the second direction.

6. The relay transport device according to claim 1, wherein when a medium having a length in the width direction of the medium shorter than a predetermined length is transported, a suction force in a downstream region of the first transport belt in the transport direction against the medium is larger than a suction force in an upstream region of the second transport belt in the transport direction against the medium.

7. The relay transport device according to claim 1, wherein when a medium having a length in the width direction of the medium shorter than a predetermined length is transported, the suction force of the first transport belt against the medium is larger than the suction force of the second transport belt against the medium.

8. The relay transport device according to claim 1, further comprising:

a transport roller pair provided upstream in the transport direction with respect to the first transport belt and configured to transport the medium to the first transport belt, wherein a suction force of the first transport belt against the medium or a suction force of the first transport belt against the medium and the suction force of the second transport belt against the medium are changeable.

9. The relay transport device according to claim 1, further comprising:

a transport roller pair provided upstream in the transport direction with respect to the first transport belt and configured to transport the medium to the first transport belt, wherein a suction force of the first transport belt against the medium is weaker than a suction force of a second transport belt against the medium.

10. The relay transport device according to claim 1, wherein the suction section is provided separately for each of the first transport belt and the second transport belt.

11. A recording system comprising:

a recording device for recording on a medium;

a feeding device disposed outside the recording device and configured to feed the medium to the recording device; and the relay transport device according to claim 1, the relay transport device being positioned between the recording device and the feeding device and configured to relay and transport the medium fed from the feeding device to the recording device.

12. A feeding system that feeds a medium to a recording device for recording on the medium, the feeding system comprising:

a feeding device disposed outside the recording device and configured to feed the medium to the recording device and the relay transport device according to claim 1, the relay transport device being positioned between the recording device and the feeding device and configured to relay and transport the medium fed from the feeding device to the recording device.

13. The relay transport device according to claim 1, wherein the suction section includes a first suction blower arranged on a first area and a second suction blowers arranged on a second area that is different from the first area, and the suction force of the first transport belt against the medium and the suction force of the second transport belt against the medium are changeable by independently adjusting rotational speeds of the first suction blower and the second suction blower.

14. The relay transport device according to claim 1, further comprising a first suction plate portion arranged between the suction section and the first transport belt; and a second suction plate portion arranged between the suction section and the second transport belt, wherein the suction section sucks the medium via a through hole provided in each of the first suction plate portion and the second suction plate portion.

15. The relay transport device according to claim 14, wherein a suction force applied by the suction unit is varied by adjusting a size of the through hole in each of the first suction plate portion and the second suction plate portion.

* * * * *